(12) United States Patent
Zamora Esquivel et al.

(10) Patent No.: US 11,249,492 B2
(45) Date of Patent: Feb. 15, 2022

(54) METHODS AND APPARATUS TO FACILITATE AUTONOMOUS NAVIGATION OF ROBOTIC DEVICES

(71) Applicant: Intel Corporation, Santa Clara, CA (US)

(72) Inventors: Julio Cesar Zamora Esquivel, Zapopan (MX); Rodrigo Aldana Lopez, Zapopan (MX); Leobardo Campos Macias, Guadalajara (MX); Jesus Adan Cruz Vargas, Zapopan (MX); Rafael de la Guardia Gonzalez, Guadalajara (MX); David Gomez Gutierrez, Tlaquepaque (MX); Edgar Macias Garcia, Zacapu (MX)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 16/365,361

(22) Filed: Mar. 26, 2019

(65) Prior Publication Data

US 2019/0220043 A1 Jul. 18, 2019

(51) Int. Cl.
*G05D 1/10* (2006.01)
*G05D 1/00* (2006.01)
(Continued)

(52) U.S. Cl.
CPC ............ *G05D 1/102* (2013.01); *G05D 1/0011* (2013.01); *G05D 1/0088* (2013.01);
(Continued)

(58) Field of Classification Search
CPC .... G05D 1/102; G05D 1/0011; G05D 1/0088; G05D 1/0246; G05D 1/0282; G06K 9/00
See application file for complete search history.

(56) References Cited

U.S. PATENT DOCUMENTS 9,964,951 B1 * 5/2018 Dunn .................... G08G 5/0052
10,810,445 B1 * 10/2020 Kangaspunta ....... G06K 9/6262
(Continued)

OTHER PUBLICATIONS

Fuentes-Pacheco et al., "Visual Simultaneous Localization and Mapping: A Survey," Springer Science+Business Media Dordrecht 2012, Published online: Nov. 13, 2012, 28 pages.
(Continued)

*Primary Examiner* — Hussein Elchanti
(74) *Attorney, Agent, or Firm* — Hanley, Flight & Zimmerman, LLC

(57) ABSTRACT

Methods and apparatus to facilitate autonomous navigation of robotic devices. An example autonomous robot includes a region model analyzer to: analyze a first image of an environment based on a first neural network model, the first image captured by an image sensor of the robot when the robot is in a first region of the environment; and analyze a second image of the environment based on a second neural network model, the second image captured by the image sensor when the robot is in a second region of the environment, the second neural network associated with the second region. The example robot further includes a movement controller to: autonomously control movement of the robot within the first region toward the second region based on the analysis of the first image; and autonomously control movement of the robot within the second region based on the analysis of the second image.

27 Claims, 15 Drawing Sheets

(51) Int. Cl.
    *G05D 1/02*     (2020.01)
    *G06K 9/00*     (2006.01)

(52) U.S. Cl.
    CPC ......... *G05D 1/0246* (2013.01); *G05D 1/0282* (2013.01); *G06K 9/00* (2013.01)

(56) References Cited

U.S. PATENT DOCUMENTS

| | | | | |
|---|---|---|---|---|
| 2005/0165508 | A1* | 7/2005 | Kanda | G06N 3/008 700/245 |
| 2016/0124431 | A1* | 5/2016 | Kelso | G06K 7/1426 701/28 |
| 2018/0364740 | A1* | 12/2018 | Collins | G05D 1/0684 |
| 2019/0213438 | A1* | 7/2019 | Jones | G06T 7/74 |
| 2020/0082174 | A1* | 3/2020 | Charette | G06K 9/6273 |
| 2021/0080272 | A1* | 3/2021 | Zhou | G01C 21/3453 |
| 2021/0121032 | A1* | 4/2021 | Kim | A47L 9/2852 |

OTHER PUBLICATIONS

Kingma et al., "Adam: A method for Stochastic Optimization," Published as a conference paper at International Conference on Learning Representations (ICLR) 2015, 15 pages.

Loquercio et al., "DroNet: Learning to Fly by Driving," IEEE Robotics and Automation Letters, vol. 3, Issue 2, Jan. 23, 2018, 8 pages.

Pomerleau, "Alvinn: An Autonomous Land Vehicle in a Neural Network," Published in Advances in neural Information processing systems 1, pp. 305-313, 1989, 4 pages.

Sadeghi et al., "CAD2RL: Real Single-Image Flight Without a Single Real Image," Conference: Robotics: Science and Systems 2017, 12 pages.

Smolyanskiy et al., "Toward Low-Flying Autonomous MAV Trail Navigation using Deep Neural Networks for Environmental Awareness," Published in 2017, 7 pages.

Zhu et al., "Target-driven Visual Navigation in Indoor Scenes using Deep Reinforcement Learning," 2017 IEEE International Conference on Robotics and Automation (ICRA), May 2017, 8 pages.

* cited by examiner

METHODS AND APPARATUS TO FACILITATE AUTONOMOUS NAVIGATION OF ROBOTIC DEVICES

FIELD OF THE DISCLOSURE

This disclosure relates generally to autonomous robots, and, more particularly, to methods and apparatus to facilitate autonomous navigation of robotic devices.

BACKGROUND

In recent years, many techniques have been developed to enable the autonomous navigation of aerial and ground-based robots. Autonomous navigation of a robot refers to a robot controlling its movement within an environment without real-time input from a human. Enabling robots to autonomously navigate through an environment often requires significant processing and/or memory capacity. More particularly, autonomous navigation is often computationally intensive because robots must process and respond to relatively large amounts of data including, for example, data representing maps of the environment as well as real-time feedback from sensors monitoring the surrounding environment. Further, in some situations, autonomous navigation may also require significant amounts of memory to store the maps of the environment through which the robots are to navigate.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
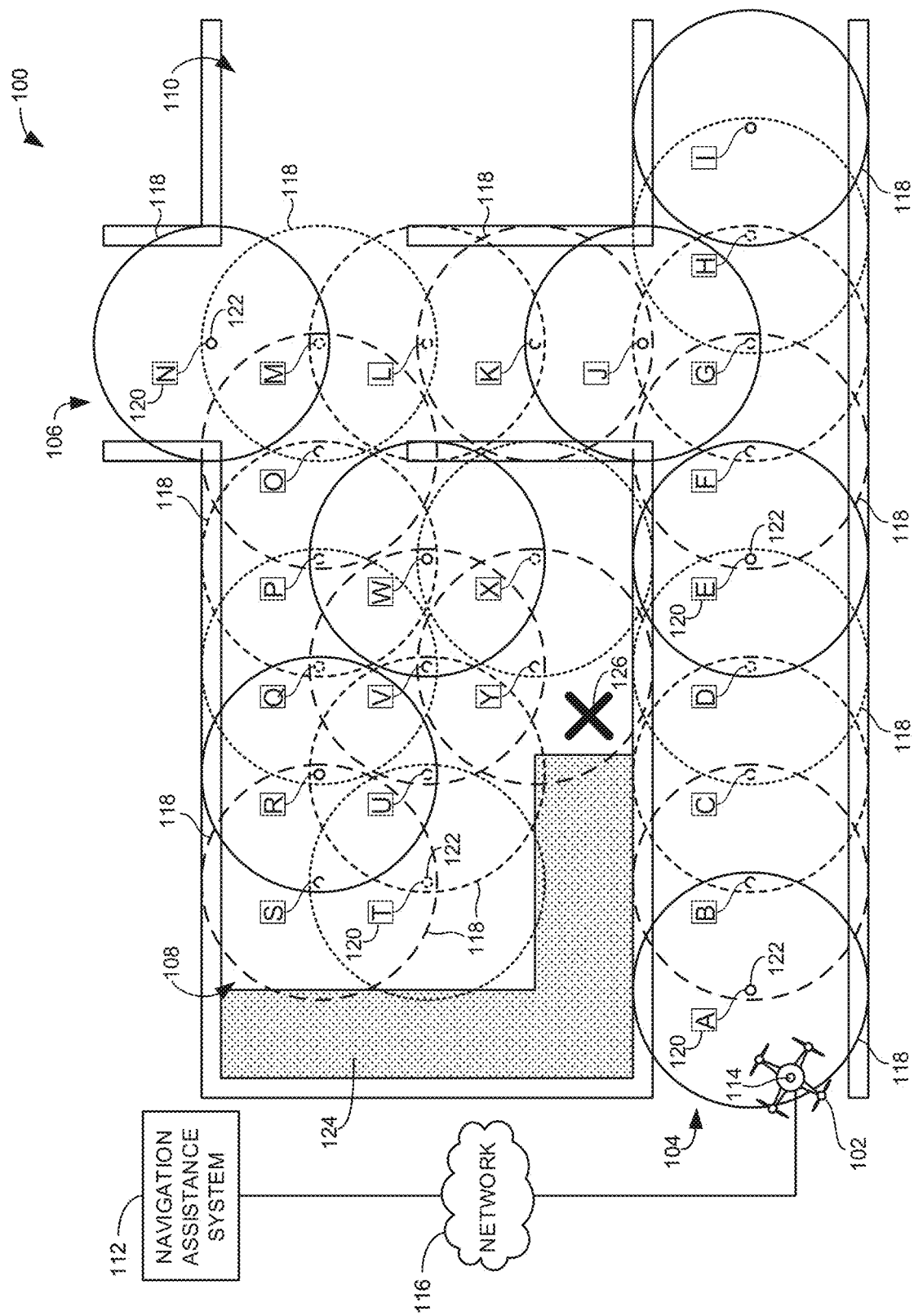
FIG. 1 illustrates an example environment in which an example autonomous robot may navigate in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Autonomous mobile robots (also referred to herein as robotic devices or simply robots for short) are being developed for various applications including delivery services, structural inspections, and surveillance, among others. Such robots may be able to fly through the air (e.g., unmanned aerial vehicles (UAVs) (also known as drones)) and/or travel on the ground. As technology expands, it is likely that robots implemented for such purposes will need to navigate inside office buildings, warehouses, industrial premises, etc. Further, there are likely to be situations where the owner and/or operator of a particular premises (e.g., a business owner) in which a robot is to navigate is different than the owner of the robot navigating the premises (e.g., a delivery service). In many such situations, the robot may have never been to the particular premises before. Such situations present several challenges for autonomous navigation to enable the robot to go directly to its intended destination without wandering about or getting lost and to ensure the robot does not go into a restricted area (e.g., due to privacy, safety, and/or other concerns).

One known approach to enable autonomous navigation is based on simultaneous localization and mapping (SLAM). SLAM requires a robot to generate and maintain a map of the environment to be navigated before the robot begins travelling in the environment. As the robot moves through the environment, the robot may update or refine the map in substantially real-time based on sensor feedback. If the robot is owned by a third party entity, the robot will need to be provided the map upon arrival to the premises before beginning to navigate within the area. Further, to reliably enable the robot to navigate within a particular premises, the map of the premises would need to be relatively detailed to account for potential obstacles the robot may encounter. Such detail is likely to result in relatively large amounts of data for an environment of any substantial size and/or complexity. As such, the robot would need to have a relatively large memory capacity to store the data representative of such a map. The relatively large amount of map data to be downloaded by the robot also results in the need for relatively large communications bandwidth to reduce the amount of undue delay while a robot downloads the map data upon arrival at the premises. Further, the large amount of map data also necessitates that the robot has a relatively large computational capacity to process the data. While robots may be constructed with large memory, bandwidth, and computational capacities, such builds are often cost prohibitive for many applications. Furthermore, there are significant costs with maintaining and/or updating a map of a particular premises that may change relatively frequently (e.g., due to movement of furniture, repurposing of certain areas for different usages, etc.).

Additionally, providing a detailed map of a premises to third party entities (e.g., that own robots to move through the premises) may present privacy and/or security concerns. Indeed, merely allowing a robot owned by a third party to navigate within the premises may present privacy and/or security concerns, independent of whether a detailed map is provided. For example, to safely and reliably navigate through an indoor environment, robots often capture images of an entire area surrounding the robot to identify any obstacles that need to be avoided. However, in doing so, the robot may capture images of sensitive and/or private information (e.g., the content on a computer screen in a room through which the robot is navigating).

Examples disclosed herein overcome some or all of the above challenges by enabling the autonomous navigation of a robot in a manner that requires significantly less memory, bandwidth, and/or processing capacity than many existing autonomous navigation techniques. Further, examples disclosed herein reduce privacy concerns by enabling robots to navigate through an environment without a map of the environment. As used herein, a map of the environment corresponds to information (in any suitable format understood by a robot) that identifies objects within the environment and their spatial relationship. Examples disclosed herein enable an owner and/or operator of a premises to control the areas of the premises for which a robot is provided navigation data, thereby preventing a third party robot from gaining access to or any knowledge of other areas of the premises. Furthermore, in some examples, the direction in which image sensors of the robot are angled is limited to significantly reduce the likelihood of capturing images containing subject matter of a sensitive and/or private nature.

FIG. 1 illustrates an example environment 100 in which an example autonomous robot 102 may navigate in accordance with teachings disclosed herein. In the illustrated example, the environment 100 is a portion of a building that includes a first hallway or corridor 104 that intersects with a second hallway or corridor 106. Further, the environment 100 includes a first room 108 accessed from the second hallway 106 and a second room 110 on the opposite side of the second hallway 106. Although the example environment 100 of FIG. 1 is a building with different rooms and hallways, examples disclosed herein may be implemented in any other type of environment. For example, the environment may correspond to a warehouse or other open space. Further, although examples disclosed herein are described in connection with indoor environments, teachings of this disclosure may also be implemented in outdoor environments.

In the illustrated example of FIG. 1, the example robot 102 is shown as an unmanned aerial vehicle (UAV) (also known as a drone). In other examples, any type of robot capable of autonomously moving through the environment 100, whether by flying (as with a UAV) or travelling on the ground (e.g., via wheels, robotic legs, etc.).

In some examples, the navigation assistance system 112 is controlled and/or managed by the same entity that controls and/or manages the premises associated with the environment 100 (e.g., an owner, a renter, etc.). In some examples, the navigation assistance system 112 is located on the premises associated with the environment 100. In other examples, the navigation assistance system 112 is remotely located. In some examples, the navigation assistance system 112 may be a distributed system that includes components that are onsite and other components that are remotely located. In some examples, the robot 102 is owned, operated, and/or managed by the same entity that controls and/or manages the navigation assistance system 112. In other examples, the robot 102 may be owned, operated, and/or managed by a third party entity. For example, the robot 102 may be associated with a delivery service, a surveillance service, an inspection service, etc.

In the illustrated example, the robot 102 is enabled to navigate through the environment 100 based on navigation assistance data provided from a navigation assistance system 112 in conjunction with images captured by an image sensor 114 (e.g., a camera) on the robot 102. In the illustrated example, the image sensor 114 is on the top of the robot to capture images of a ceiling of the premises of the environment 100. Directing the image sensor 114 toward the ceiling reduces privacy concerns relative to other navigation techniques that involve capturing images at all angle within the environment because it is unlikely that the ceiling will contain private and/or sensitive information that would be caught on camera. In some examples, the image sensor 114 may be directed in another direction other than upward (e.g., facing downward to capture images of the floor (or ground if outside)). In the illustrated example, the robot 102 receives navigation assistance data from the navigation assistance system 112 over a network 116. In some examples, the network 116 may correspond to a local area network (LAN) associated with the environment 100. In other examples, the network 116 may correspond to a wide area network (WAN) such as, for example, the Internet. In some examples, the robot 102 may provide security information (e.g., password or other login information) before being able to connect to the navigation assistance system 112 to receive the navigation assistance data.

In some examples, the navigation assistance data includes information that enables the robot 102 to navigate within particular navigation regions 118 within the environment 100. In the illustrated example of FIG. 1, the navigation regions 118 are represented by different overlapping circles. The solid and broken lines used for different ones of the circles representing different ones of the regions 118 do not have any particular significance, but are drawn as shown to assist in distinguishing one region from another for purposes of clarity. Although the regions 118 are represented as circles, the regions 118 may be any suitable shape corresponding to overlapping subdivisions of the environment 100. In some examples, each region 118 is associated with a correspond tag or identifier 120. The identifiers are shown in the illustrated example as letters with lead lines pointing to a center point 122 of each corresponding region 118. For purposes of explanation, particular ones of the regions 118 will be identified by their corresponding identifier 120. Thus, for example, the first region 118 in which the robot 102 is located as shown in FIG. 1 is referred to herein as region A.

In some examples, the size and location of the regions 118 are designated by a user through the navigation assistance system 112 as described more fully below. As shown in the illustrated examples, the regions 118 are smaller than the total area of the environment 100. In some examples, the regions are less than 10 feet in diameter or smaller (e.g., less than 6 feet in diameter, less than 3 feet in diameter, etc.). For the sake of simplicity in explanation, the regions 118 are shown as having a diameter approximately corresponding to the width of the hallways 104, 106. However, in other examples, the regions 118 may have a diameter that is smaller than the width of the hallways 104, 106. Further, although all of the regions 118 shown in FIG. 1 are the same size, in some examples, different ones of the regions 118 may be different sizes. For example, the regions 118 within the first room 108 may be larger than the width of the hallways 104, 106.

As shown in the illustrated example, the regions 118 are located so as to overlap one another such that multiple adjacent ones of the regions 118 collectively cover all or substantially all areas in the environment 100 through which the robot 102 is to navigate. In some examples, locations within the environment 100 containing obstacles that would obstruct the movement of the robot 102 are not associated with a navigation regions 118. Thus, for example, no regions are directly aligned with the walls defining the hallways 104, 106 and rooms 108, 110. Further, the first room 108 is shown as including one or more obstacle(s) 124 (e.g., furniture, cabinets, shelving, etc.) that would obstruct movement of the robot 102 such that no regions 118 are defined in the corresponding space. In some examples, navigation regions 118 may be excluded from areas where the robot 102 could physically navigate but where the owner or operator of the premises does not want the robot 102 to go for any suitable reason (e.g., safety concerns, security concerns, privacy concerns, etc.). In the illustrated example, the second room 110 is an area in which the robot 102 is not to enter. Accordingly, there are no designated regions 118 within the second room 110. As explained more fully below, the robot 102 is only able to navigate within an area of the environment 100 that corresponds to a designated navigation region 118. As a result, the absence of regions 118 defined in the areas corresponding to the obstacle(s) 124 in the first room 108 and to the entire second room 110, prevent the robot 102 from navigating in those areas. Excluding areas of the environment 100 that include obstacles significantly reduces the processing requirements of the robot 102 because the robot does not need to expend processing capacity on object detection and avoidance.

As mentioned above, adjacent ones of the regions 118 are positioned so as to overlap. More specifically, in the illustrated example, each region 118 overlaps with at least one adjacent region 118 such that the center points 122 of the adjacent regions are located within the boundaries of each other. Thus, as shown in FIG. 1, the center point 122 of region A is inside the outer boundary of region B. Likewise, in the illustrated example, the center point 122 of region B is inside the outer boundary of region A. As shown in the illustrated example, regions B and C similarly overlap so that their center points 122 are located within the outer boundary of each other. Inasmuch as the center point 122 of region B is located within the boundaries of both region A and region C, regions A and C also overlap by a small degree. Thus, while each region 118 overlaps at least one adjacent region 118 by a sufficient amount to enclose the center point 122 of the adjacent region, the region may overlap other regions to a lesser extent. In some areas, a single region 118 may include the center points 122 of multiple adjacent regions 118 and overlap with multiple other regions. For example, in FIG. 1, region V (in the middle of the first room 108) is positioned so as to include the center points 122 of regions Q, U, W, and Y. Additionally, as shown in FIG. 1, region V overlaps with regions P, R, and X by a substantial portion (though not enough to enclose their center points 122). Further, region V overlaps with region T in an area surrounding the center point 122 of region U. Based on the arrangement and size of the regions 118 in the illustrated example of FIG. 1, the maximum number of center points 122 of adjacent regions 118 that a particular region 118 can enclose is four (as demonstrated by region Y). However, in other examples (based on different arrangements and/or sizes of the regions 118), the number of adjacent regions 118 with overlapping center points 122 could be a greater or lesser number. For example, if the regions 118 were enlarged without moving their center points, region Y may incorporate the center points of regions P, R, and X in addition to regions Q, U, W, and Y.

Adjacent ones of the regions 118 are arranged to have overlapping center points 122 to enable the robot 102 to navigate from one region 118 to the next using a relatively simple model specific to each region that can significantly reduce processing requirements for the robot's navigation system. Separate models for different ones of the regions 118 are generated and stored in advance (e.g., before the robot 102 is to navigate through the environment 100 based on such models) by the navigation assistance system 112. The navigation assistance data that is provided by the navigation assistance system 112 includes individual ones of the models corresponding to the particular regions 118 through which the robot 102 is to navigate to arrive at a final destination 126 (located in region Y in the illustrated example). For purposes of explanation, individual models corresponding to individual ones of the regions 118 are identified herein based on the associated identifier 120 for the respective region shown in FIG. 1. That is, the model associated with region A is referred to herein as model A. Inasmuch as each model corresponds to a relatively small region 118 within the environment 100, the processing capacity needed to evaluate each model is significantly smaller than the processing capacity required to implement many known navigation techniques that may, for example, include a map of the entire environment.

In some examples, the models are neural network models generated and/or trained based on hundreds or even thousands of images of the corresponding regions being modelled. The images are captured by one or more image sensors (e.g., cameras) facing in the same direction as the image sensor 114 on the robot 108. That is, if the image sensor 114 is oriented to capture images of a ceiling of the environment 100, the models associated with the regions 118 will also be based on images of the ceiling taken from different locations within the respective regions. Thus, when the robot 102 captures an image with the image sensor 114 while located within a particular region 118, the robot 102 will evaluate the image using the corresponding model associated with the particular region to determine how to navigate within the region.

More particularly, for every image captured by the image sensor 114 and analyzed by the robot 102, a model is designed to produce two outputs including a distance metric and an angle or orientation metric. The distance metric provides a measure of the distance between the robot 102 and the center point 122 of the region 118 within which the robot 102 is navigating. As mentioned above, the different regions 118 overlap such that the robot is likely to be in more than one region at any given point in time. However, the robot 102 navigates based on a single model associated with a single region 118 at any given point in time. Thus, the distance to the center point 122 of the region 118 within which the robot 102 is navigating refers to the region associated with the model currently being evaluated by the robot 102. In other words, when the robot 102 is navigating in region A, the robot 102 is navigating based on model A. The angle or orientation metric provides a measure of an angle between some reference direction and a line extending from the robot 102 to the center point 122 of the region 118 within which the robot 102 is navigating. That is, the angle or orientation metric indicates the orientation of the robot 102 relative to the center point 122 of the region 118 within which the robot 102 is navigating.

In some examples, the robot 102 is able to autonomously navigate within a particular region based on no information other than its distance from and orientation relative to the center point 122 of a relevant region 118 as output by the corresponding model associated with the region. This is possible because the navigation system implemented by the robot 102 is limited to autonomously move the robot 102 toward the center point 122 of the corresponding region. That is, the robot 102 is able to control its speed of movement based on its distance from the center point 122 and is able to control its direction of movement based on its orientation relative to the center point 122. Based on this system of navigation there is no need for the robot 102 to monitor the area immediately surrounding the robot 108 to detect obstacles and determine how to move relative to such obstacles. As already mentioned above, any obstacles in the environment 100 have already been accounted for by excluding areas of the environment 100 containing such obstacles from having a designated region 118 within which the robot 102 is to navigate. Furthermore, while there may be obstacles near the edges or boundaries of certain navigation regions 118 (e.g., the walls of the first hallway 104 are within the boundary of region A), these obstacles are not of concern because the robot 102 is designed to move toward the center point 122 (i.e., away from such obstacles). Thus, while areas containing obstacles may be excluded from being associated with a navigation region 118, in some examples, certain regions may cover areas containing obstacles so long as the center points of such regions are spaced away from the obstacles.

While the robot 102 may be able to navigate based exclusively on an analysis of images captured by the image sensor 114, in some examples, the robot 102 may have one or more proximity sensors to detect nearby obstacles that may not be accounted for when the different regions 118 were designated and corresponding models generated for each such region. While obstacle detection based on an analysis of feedback from proximity imposes some computational burdens on the robot 102, such burdens are significantly less than the computational burden of a robot navigating through an unknown environment using known techniques.

The process of navigating to the center point 122 of a particular region 118 in the environment 100 can enable the robot 102 to navigate through the entire environment 100 to any desired destination (e.g., the final destination 126 of FIG. 1) by linking separate ones of adjacent regions into a series and repeating the navigation process each time the robot 102 enters a new region. As mentioned above, the regions overlap so that the center point 122 of one region is within the boundary of an adjacent region. As such, by navigating to the center point of the first region 118, the robot has necessarily navigated into the adjacent region. Thus, to navigate to the center point of the adjacent region, the robot merely needs to switch to evaluating the model associated with the adjacent region and then repeat the navigation process. This is explained in greater detail in connection with FIGS. 2 and 3.

Figure 2:
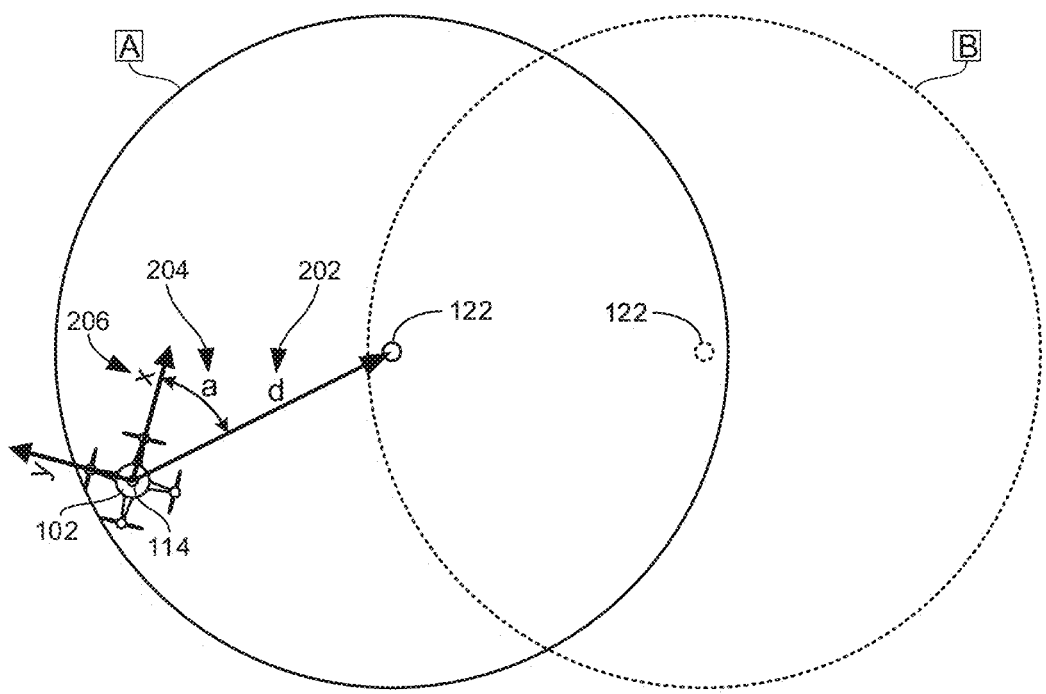
FIGS. 2 and 3 show an enlarged view of region A and region B of FIG. 1 with the robot scaled smaller for increased clarity.
Figure 3:
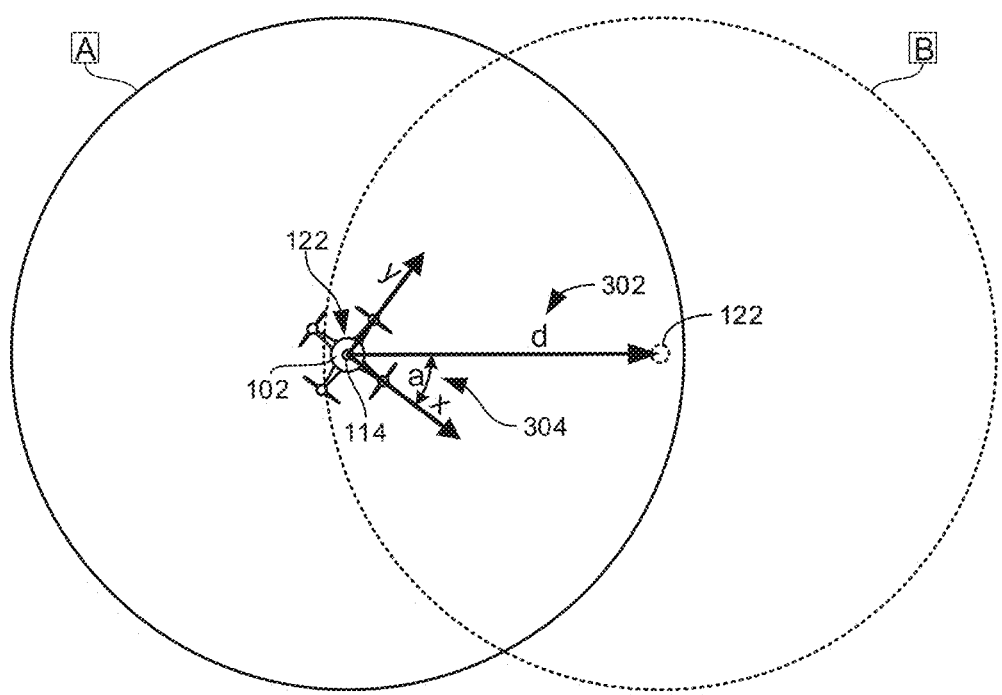

FIGS. 2 and 3 show an enlarged view of region A and region B of FIG. 1 with the robot 102 scaled smaller for increased clarity. More particularly, FIG. 2 represents a first point in time when the robot 102 first begins navigating within region A and FIG. 3 represents a later point in time when the robot 102 has navigated to the center point of the region A. As shown in FIG. 2, the position and orientation of the robot 102 can be defined by a distance 202 between the robot 102 and the center point 122 of the region A and an angle 204 between a reference direction 206 (e.g., associated with a coordinate system corresponding to the robot 102) and a line extending from the robot 102 toward the center point 122 of region A. This position and orientation information is determined by evaluating a neural network model associated with region A (e.g., model A) based on an image captured by the image sensor 114. Based on the position and orientation information, the robot 102 can control its movement toward the center point without any other information. As the robot 102 moves through region A, additional images may be captured by the image sensor 114 that are then analyzed using the associated model A to determine new values for the position and orientation information. In this manner, the robot 102 can reevaluate and update its movement in substantially real-time until it reaches the center point 122 of the region in which it is navigating (e.g., region A in FIG. 2).

As mentioned above and shown in the illustrated examples, region B overlaps the center point 122 of region A. As such, when the robot 102 reaches the center point 122 of region A (or comes within a threshold distance of the center point 122) the robot 102 is also located within region B. Accordingly, the robot 102 may begin navigating within region B. That is, the robot 102 may analyze an image captured by the image sensor 114 using a neural network model associated with region B (e.g., model B) to determine a new distance 302 and a new angle 304 indicating the position and orientation of the robot relative to the center point 122 of region B. Based on this information, the robot 102 may navigate to the center point of region B as described above. This process may be repeated through any number of overlapping regions 118 extending over any suitable area through the environment 100, thereby enabling the robot 102 to navigate to any location within the environment 100 without a map of the entire environment identifying objects and/or obstacles in the environment and their associated spatial relationships.

The particular chain, sequence, or series of overlapping regions 118 through which a robot 102 navigates to arrive at a desired destination (e.g., the final destination 126 of FIG. 1) is determined and provided to the robot 102 by the navigation assistance system 112. As mentioned above, the navigation assistance system 112 is used to initially designate all the navigation regions 118 in the environment and then generate and store the neural network models associated with each of the regions. Therefore, based on a beginning location of the robot 102 and a final destination 126, the navigation assistance system 112 may identify the particular regions 118 defining a travel path the robot 102 is to follow to arrive at the final destination 126. Once the travel path has been determined, the navigation assistance system 112 may provide navigation assistance data to the robot 102 so that the robot 102 may begin navigating toward the final destination 126. As mentioned above, the navigation assistance data includes the neural network models associated with the regions 118 corresponding to the travel path the robot 102 is to follow. Additionally, in some examples, the navigation assistance data includes an indication of the sequence or series of regions 118 (including their order) through which the robot 102 is to navigate so that the robot 102 can evaluate the correct model at any given point in time while moving along the designated travel path to the final destination 126.

Figure 4:
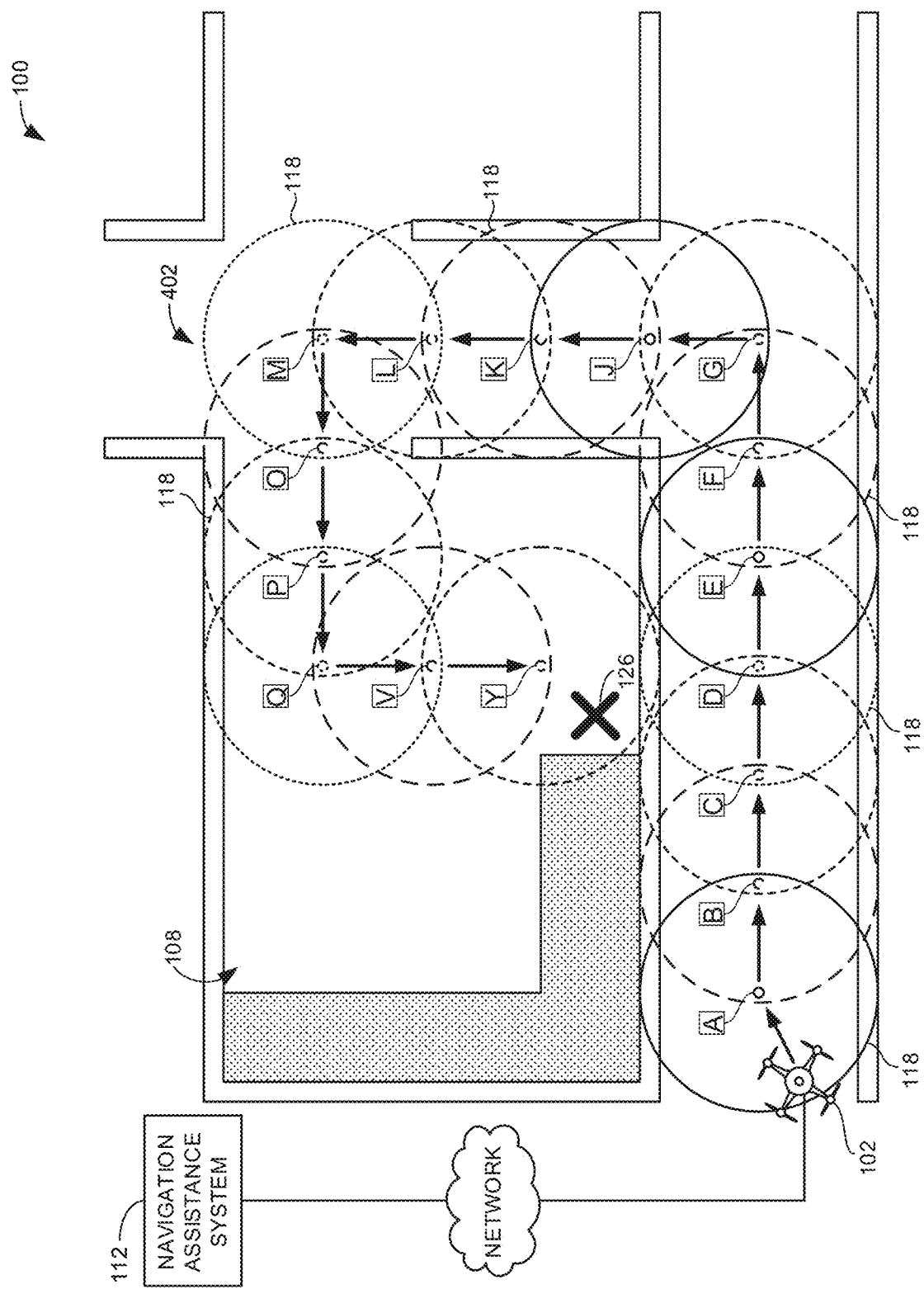
FIGS. 4 and 5 illustrate the example navigation regions of FIG. 1 corresponding to two alternate travel paths along which the example robot may navigate.

In some examples, the travel path is defined by a string including the different identifiers corresponding to the ordered sequence of regions 118 through which robot 102 is to navigate. For example, FIG. 4 identifies the particular regions 118 associated with one example travel path 402 through the environment 100 that would guide the robot 102 to region Y in which the final destination 126 is located. The sequence, chain, or series of regions in the illustrated example of FIG. 4 can be represented by the string "ABCDEFGJKLMOPQVY," which corresponds to the identifiers of each region 118 along the travel path 402 in the order through which the robot 102 navigates through them. Based on this information, the robot 102 may determine what model to evaluate first (model A in this example) and what model to switch to each time the robot 102 reaches the center point of the region in which it is currently navigating.

In some examples, rather than providing the robot 102 the entire sequence of regions to the final destination, the navigation assistance system 112 may only identify a subset of the series of regions through which the robot 102 is to pass at any one time and then provide another subset corresponding to subsequent regions after the robot 102 has already navigated through the first regions in the series. In some examples, the navigation assistance system 112 indicates each subsequent region 118 one at a time as the robot 102 advances along the travel path 402. For example, the navigation assistance system 112 may designate model A as the first model the robot 102 is to use to navigate. Without any further information, the robot 102 may navigate to the center point of region A based on model A. Once the robot reaches the center point of region A, the navigation assistance system 112 may then identify model B as the next model to apply, whereupon the robot 102 will navigate to the center point of region B based on model B. In some examples, the navigation assistance system 112 is made aware of the location of the robot 102 because the robot reports its determined position and orientation relative to the center point of the current region 118 it is in to the navigation assistance system 112.

Independent of whether the identification of the sequence of models for the robot 102 to use is provided all at once, some regions at a time, or only one region at a time, the models may also be downloaded by the robot 102 all at once, only some at a time, or only one at a time. That is, in some examples, the navigation assistance system 112 not only identifies individual ones of the models to be used for navigation at any one time, but also provides individual ones of the models at different times as the robot 102 progresses along the travel path 402. Providing the models for the different regions 118 incrementally in this manner is possible because each model is only needed when the robot 102 is within the region 118 associated with the model. That is, while model A is needed immediately for the robot 102 to begin navigating through the environment 100, models P, Q, V, and Y are not needed until the robot 102 has reached the first room 108. Accordingly, in some examples, models that are used later in the travel path 402 are downloaded at a later point in time while the robot 102 travels through the regions 118 earlier in the travel path 402. Having separate models for different regions 118 in the environment 100 that can be downloaded independently reduces the communication bandwidth requirements of the robot 102 because there is no need for the robot 102 to download everything all at once.

In some examples, the models are relatively small in terms of data size to enable their download in substantially real time as the robot 102 advances from one region to the next. That is, in some examples, the time to download one model takes less time than it takes for the robot 102 to navigate from an edge of a region to its center point. In other words, in some examples, as soon as the robot enters region B and begins navigating to the center point of region B, the robot will begin downloading model C associated with region C. In some examples, the models are sufficiently small to enable model C to be downloaded by the time the robot 102 reaches the center point of region B, thereby being ready to immediately begin navigating within region C (based on model C). In other examples, the robot 102 may download multiple models corresponding to multiple subsequent regions to provide a buffer for downloading future models as the robot 102 continues to advance through the regions 118 along the travel path 402.

The small size of the models (to enable their relatively rapid download) is made possible because of the relatively small area corresponding to each region. The small size of the models not only reduces the bandwidth requirements of the robot 102, but also reduces the memory requirements of the robot 102. Furthermore, the models that are downloaded only correspond to the relevant regions through which the robot 102 will pass rather than the entire environment 100, thereby further reducing the amount of data that is to be downloaded and stored relative to navigation systems that require the downloading and storage of a map of the entire environment. Further still, in some examples, once the robot 102 has passed through a particular region 118, the robot 102 may remove the model associated with that region from memory to further reduce the required memory capacity of the robot 102. That is, in some examples, once the robot 102 begins navigating within region B based on model B, model A used to navigate through region A may be removed from memory. In other examples, where there is sufficient memory capacity, the robot 102 may retain some or all models associated with the travel path 402 so that the robot 102 has them available when navigating in the reverse direction to leave the environment 100.

Figure 5:
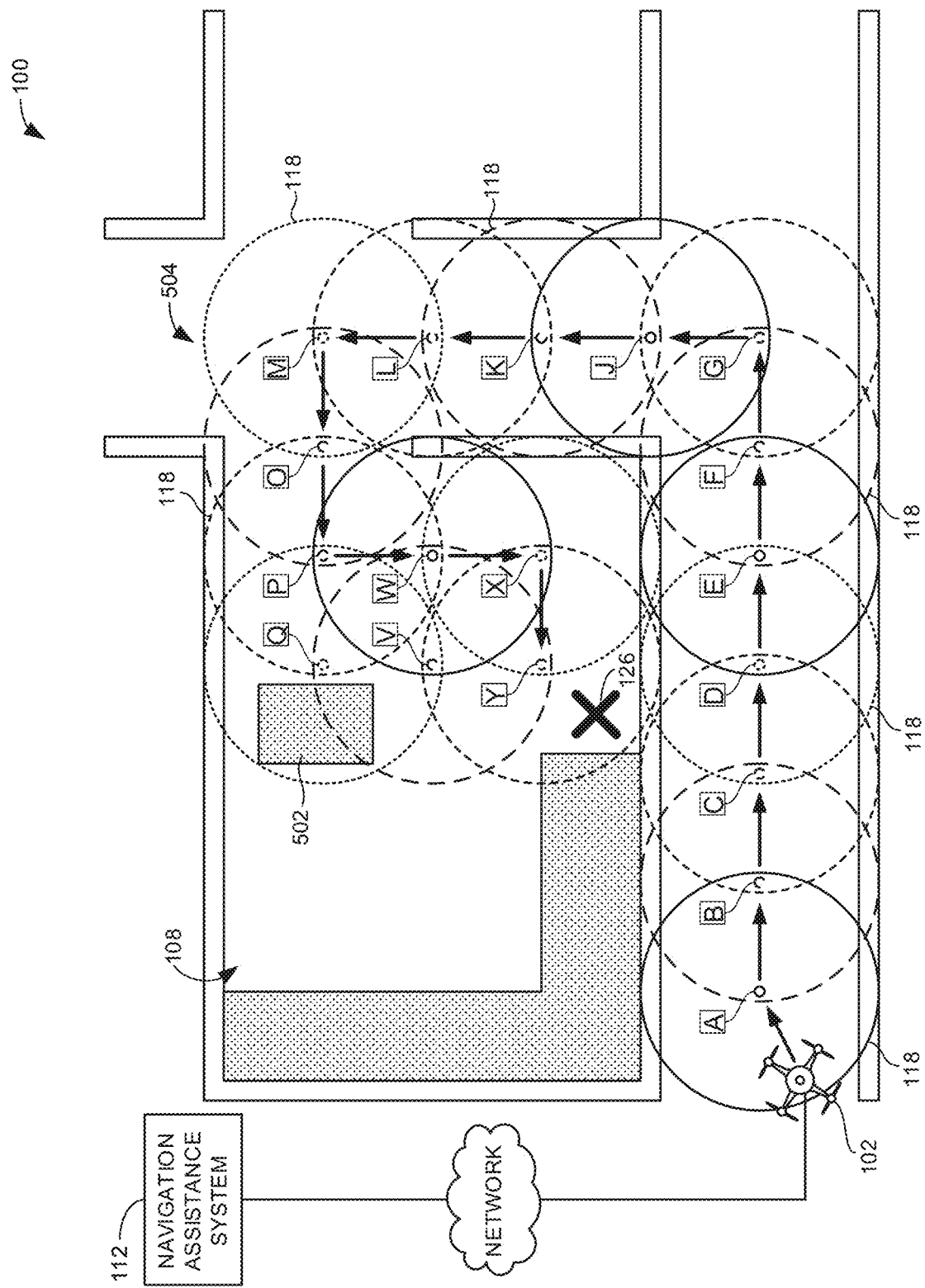

In some examples, where there is sufficient memory capacity, the robot 102 may download and store (at least temporarily) models associated with regions 118 that are not directly along the travel path 402 but adjacent to the regions 118 defining the travel path 402. For example, the robot 102 may also download models corresponding to regions R, U, W, and X (shown in FIG. 1) in connection with the travel path 402 shown in FIG. 4 because these regions are located on either side of the regions corresponding to the travel path 402. Downloading such models can enable the robot 102 to quickly change course if there is a reason to take a detour (e.g., an obstacle is detected in the initial travel path 402 designated by the navigation assistance system 112). For example, assume that the navigation assistance system 112 initially determines the travel path 402 shown in FIG. 4 as the path to guide the robot 102 through the environment 100. However, as the robot 102 reaches the center point of region P and begins navigating towards the center point of region Q, assume the robot 102 detects an obstacle 502 as shown in FIG. 5. In some examples, the robot 102 detects the obstacle 502 based on an analysis of images captured by the image sensor 114 of the robot 102. Additionally or alternatively, in some examples, the robot 102 detects the obstacle 502 based on feedback from one or more proximity sensors. The robot 102 may report that an obstacle has been detected to the navigation assistance system 112 and request an alternate route to the final destination 126. In response to such report and/or request, the navigation assistance system 112 may determine a new travel path 504 as shown in FIG. 5. In some examples, the new travel path 503 may include all regions beginning from region A even though the robot is already in region P because the robot 102 will still have to follow the reverse path to leave the environment 100. In other examples, the new travel path may be limited to between the current location of the robot 102 (e.g., within region P) and the final destination 126.

In some examples, in response to receiving the new travel path 504, the robot 102 navigates back to the center point of region P and then follows the travel path 504 through regions W, X, and Y as shown in FIG. 5. In some examples, the robot 102 may detect the obstacle 502 when the robot is relatively close to the center point of region P. As such, the robot 102 will be at a location where the robot 102 can begin navigating in region W based on model W. However, if the robot 102 has not downloaded model W before reaching the center point of region P, the robot 102 will need to wait until the model is downloaded. For this reason, in some examples, the models associated with regions 118 adjacent to regions of a currently designated travel path are also downloaded in advance as mentioned above. In some examples, the regions 118 adjacent to a travel path may include any number of adjacent regions. In some examples, if a travel path is determined to enter a particular room, hallway, or other area in the environment 100, the robot 102 may download the models associated with all the regions 118 for that particular room, hallway, or other area.

Once the robot 102 navigates to the center point of the region 118 corresponding to the final destination 126, the robot 102 may implement any suitable destination procedures intended at the particular location (e.g., deliver a package, inspect an area, etc.). The destination procedures may be implemented using any suitable techniques associated with the particular actions to be performed at the final destination 126.

As described above, advantages of examples disclosed herein are the significant reduction in the bandwidth, memory, and processing capacities needed by the robot 102 to download, store, and analyze the models used for navigation. These advantages are achieved in part by subdividing the environment 100 into multiple relatively small regions 118 with each region associated with a different model. The relatively small regions 118 results in relatively small models that can be evaluated with relatively little processing capacity. In some examples, the size of individual models may be further reduced based on an adaptive convolution layer that is based on an adaptive kernel. In the context of image processing, a kernel (also known as a convolution matrix) is a small matrix (e.g., a 3×3 matrix) with different weights or values in each element that are used to analyze adjacent pixels in an image through a convolution to calculate an output value for a particular pixel of an input image being analyzed. The kernel is convolved with the input image for each pixel to produce a final output that represents a filtered version of the input image that can assist in identifying and/or detecting features in the image.

Figure 6:
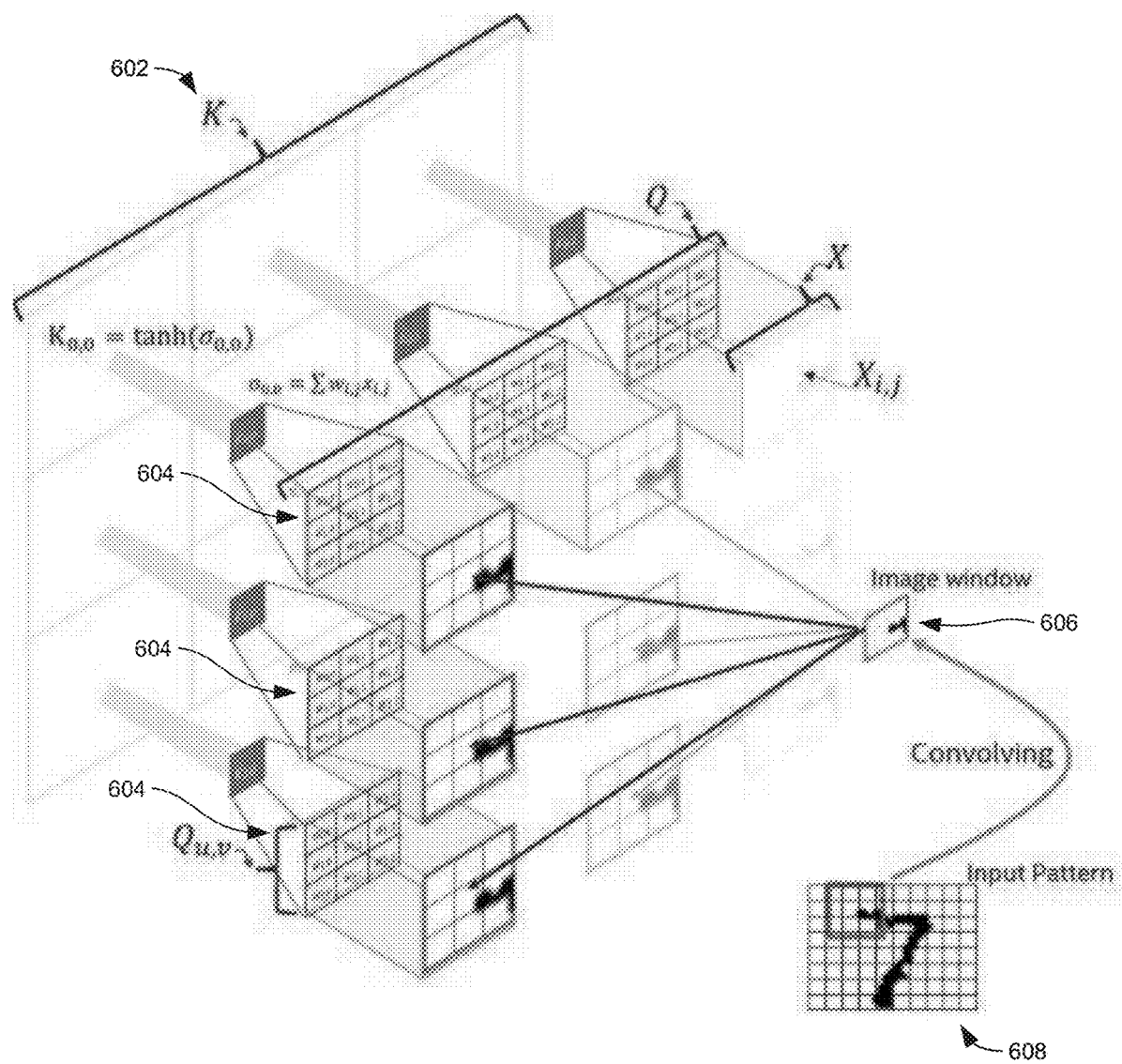
FIG. 6 illustrates the generation of an example adaptive kernel used in the neural network models associated with the example regions of FIG. 1.

In contrast with a traditional kernel that has fixed values or weights for its individual elements, an adaptive kernel, as disclosed herein, is a kernel that dynamically changes its weights based on the input image being analyzed. An adaptive kernel is generated based on a second order convolution of the input image. That is, an adaptive kernel can be conceptualized as a two-dimensional array of traditional (linear) kernels as shown in the illustrated example of FIG. 6. In particular, FIG. 6 illustrates a 3×3 adaptive kernel 602 (K) that includes nine elements with each element corresponding to a separate 3×3 linear kernel 604 ($Q_{u,v}$). The convolution of each linear kernel 604 with the window 606 (X) of the input image 608 produces a single element of the adaptive kernel 602 after applying the activation function. In some examples, the new dynamically generated adaptive kernel 602 is then convolved with the same image window 606 of the initial input image 608 to generate a single scalar output for the associated pixel being analyzed. An output value for each pixel of the input image may be generated by shifting the image window 606 and then repeating the second order convolution for the new pixel. The individual elements of the adaptive kernel 602 are dynamic because they change for each different pixel analyzed in the input image based on differences in the image window 606 used in the convolutions for each pixel. Although the adaptive kernel 602 in FIG. 6 is a 3×3 matrix, the adaptive kernel 602 may be any other suitable size (e.g., a 5×5 matrix).

Figure 7:
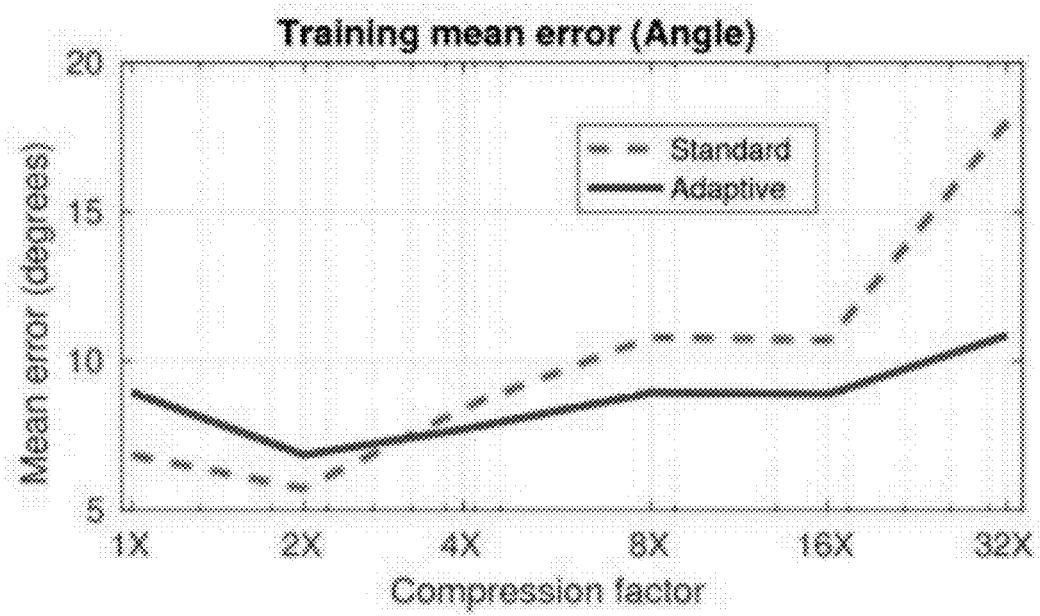
FIGS. 7-10 are graphs illustrating experimental results from implementing the adaptive kernel of FIG. 6.
Figure 8:
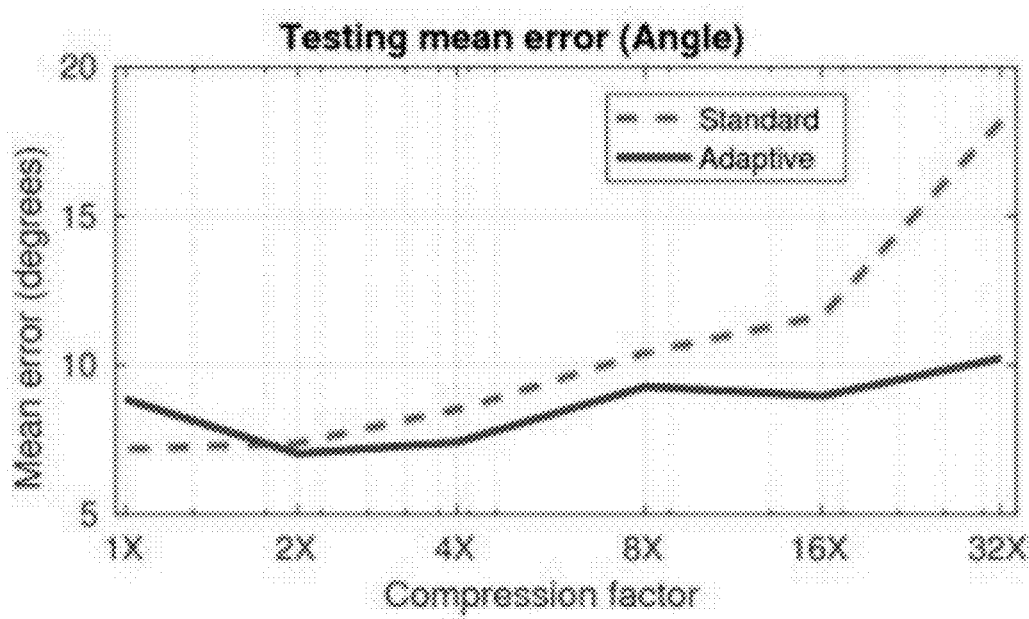
Figure 9:
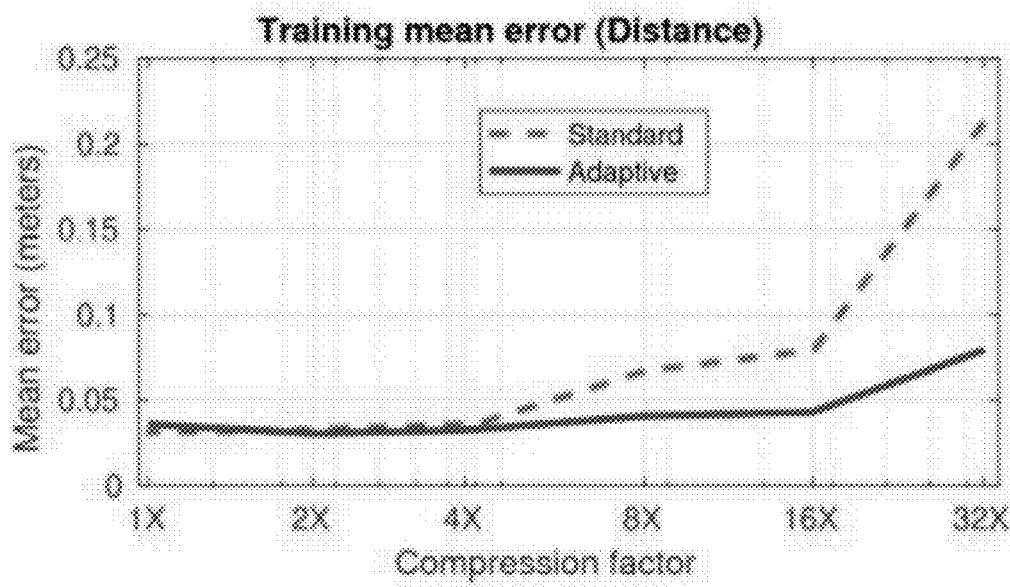
Figure 10:
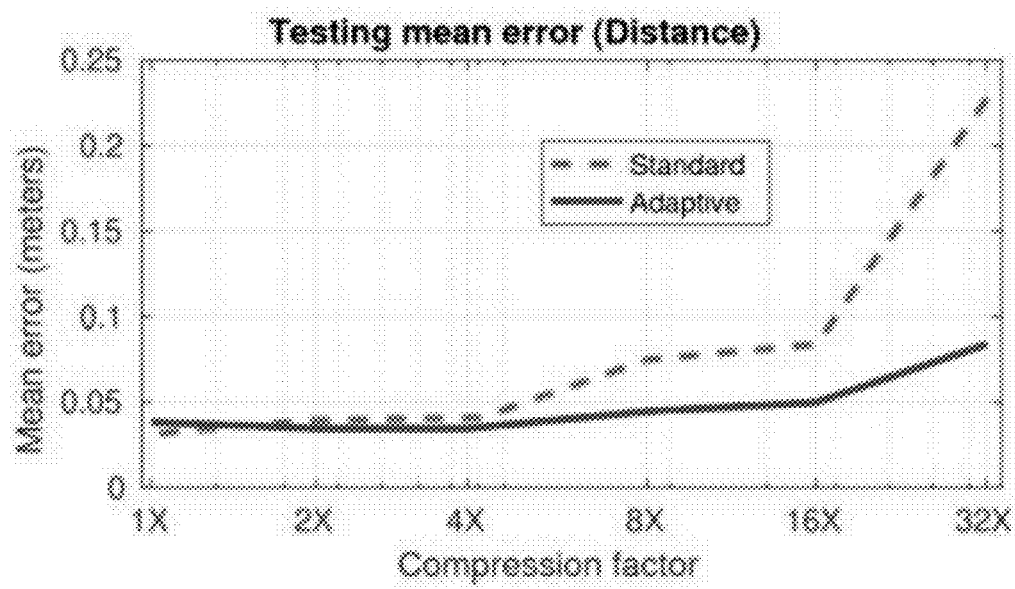

Testing has established that using an adaptive kernel as described above in the neural network models for the navigation regions 118 enables the reduction of filters in subsequent layers of a neural network without significantly affecting the performance of the neural network. In other words, implementing an adaptive kernel significantly reduces the size of models needed to produce reliable outputs for the position and orientation of a robot within a particular region associated with a given model. Further, the use of the adaptive kernel enables models that maintain greater accuracy than known navigation techniques (using a standard linear kernel) when compressed. In particular, FIGS. 7 and 8 are graphs illustrating the mean error for the angle of a robot 102 (e.g., orientation relative to a region's center point) determined from experimental training data (FIG. 7) and testing data (FIG. 8) analyzed using both standard navigation techniques and the adaptive kernel disclosed herein. As shown in the illustrated example, the adaptive kernel approach exhibits error that remains within approximately 10 degrees up to a compression factor of 32, which is significantly more reliable than the error using a standard kernel at the same compression factor. FIGS. 9 and 10 are graphs illustrating the mean error for the distance of the robot 102 (e.g., distance from a region's center point) determined from experimental training data (FIG. 9) and testing data (FIG. 10) analyzed using both standard navigation techniques and the adaptive kernel disclosed herein. As with the graphs in FIGS. 7 and 8 related to the angle, the graphs in FIGS. 9 and 10 show that the adaptive kernel is much more accurate than a standard kernel when compressed by a factor of 32.

Figure 11:
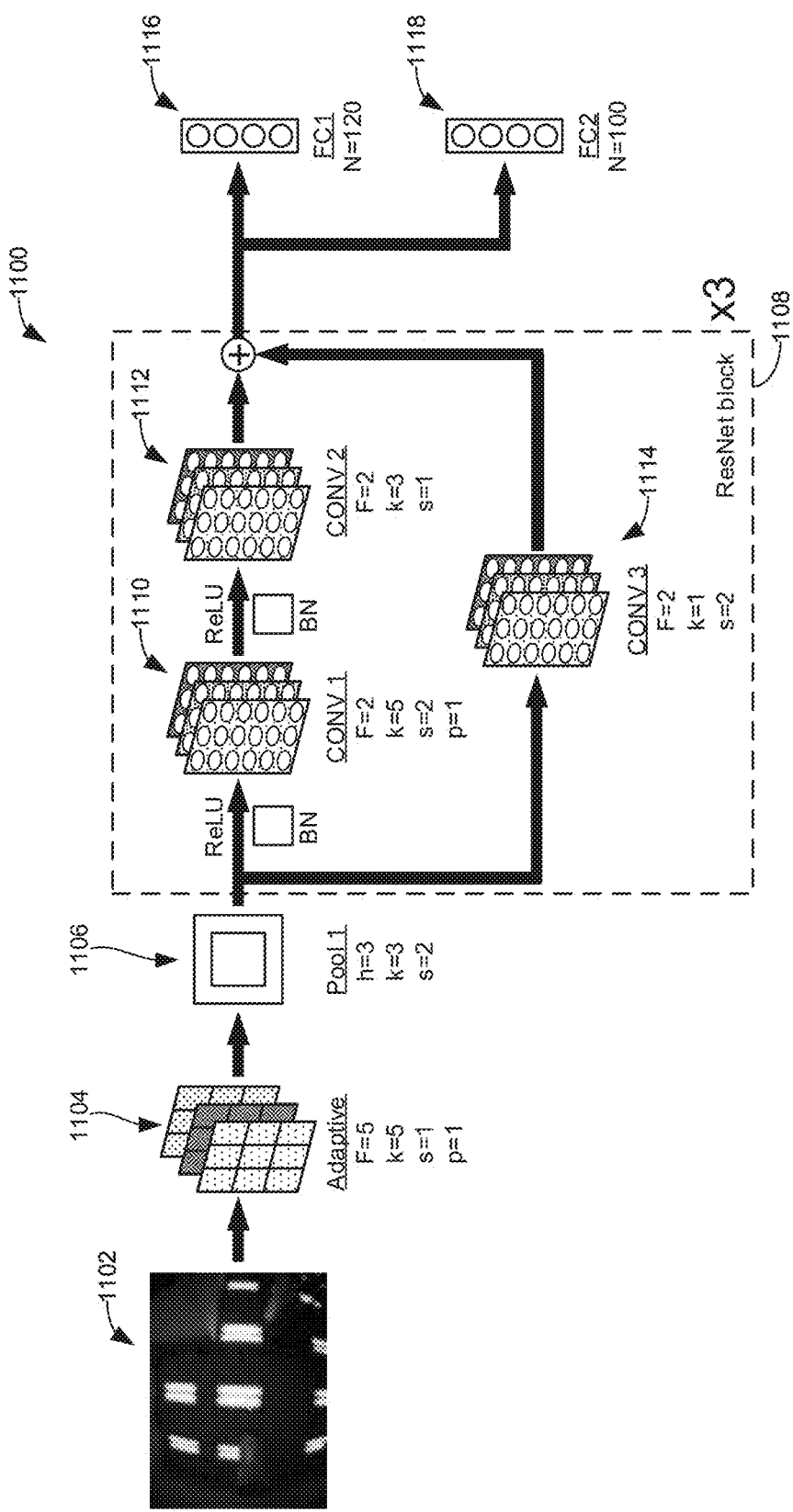
FIG. 11 illustrates an example neural network architecture or topology implemented by the example robot to navigate through the example environment of FIG. 1.

An example neural network architecture or topology 1100 implemented by the robot 102 of FIG. 1 is shown in FIG. 11. In the illustrated example of FIG. 11, a captured input image 1102 is processed through a topology including twelve trainable layers. A first layer is an adaptive convolution layer 1104 that implements the adaptive kernel described above. A second layer is a pooling layer 1106, followed by three consecutive ResNet blocks 1108 (only one is shown for the sake of clarity), each including three convolution layers 1110, 1112, 1114. The topology 1100 finishes with two full-connected (FC) layers 1116, 1118.

The last two FC layers 1116, 1118 correspond to the two outputs of the neural network model that provide an indication of the position and orientation of the robot 102 relative to the center point of a region 118 associated with the neural network model being evaluated. In some examples, the first FC layer 1116 is trained as a classification problem to determine or classify the orientation angle (e.g., the angles 204, 304 of FIGS. 2 and 3) of the robot 102 into a specific range of angles within a full 360 degree circle. In the illustrated example, the number of possible outputs or classifications for the first FC layer 1116 is 120 such that the orientation or angle of the robot 102 relative to the center point of the corresponding region 118 is determined to within 3 degrees (360/120). Greater precision in determining the orientation of the robot 102 is possible by increasing the number of possible outputs for the first FC layer 1116.

In some examples, the second FC layer 1118 is also trained as a classification problem. However, the classification problem associated with the second FC layer 1118 is to determine a distance (e.g., the distance 202, 302 of FIGS. 2 and 3) of the robot 102 from a center point of the associated region 118. In the illustrated example, the number of possible outputs or classifications for the first FC layer 1116 is 100 such that the distance of the robot 102 from the center point of the corresponding region 118 is determined to within $\frac{1}{100}^{th}$ of the radius of the corresponding region. Thus, if the region is 200 inches wide (a radius of 100 inches), the determination of the distance of the robot will be accurate to within one inch. Greater precision in determining the distance of the robot 102 from the center point is possible by increasing the number of possible outputs for the second FC layer 1118 and/or by reducing the size of the corresponding region.

Figure 12:
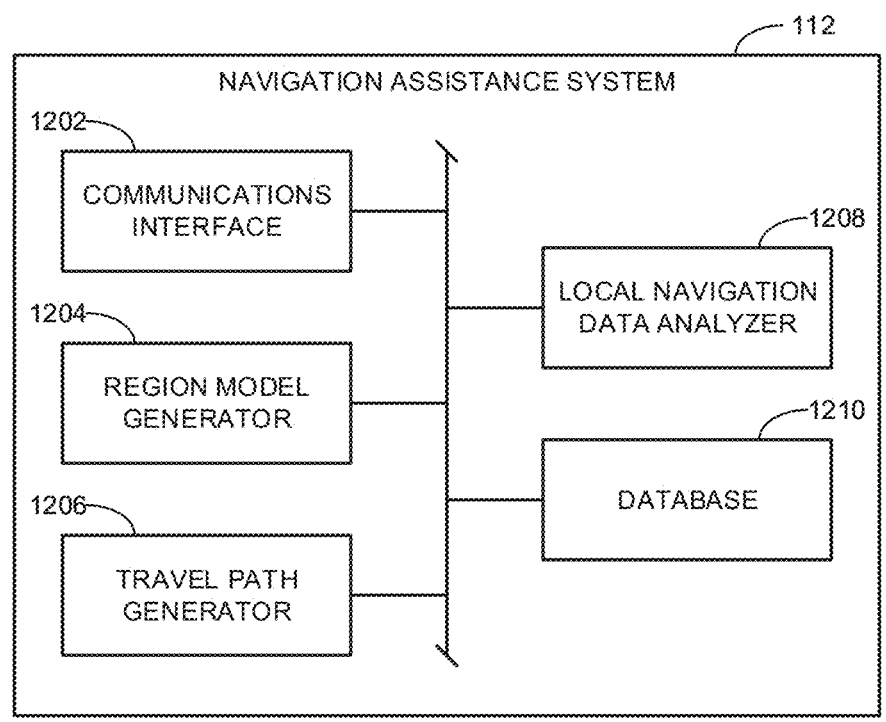
FIG. 12 is a block diagram illustrating an example implementation of the navigation assistance system of FIG. 1.

FIG. 12 is a block diagram illustrating an example implementation of the navigation assistance system 112 of FIG. 1. In the illustrated example of FIG. 12, the navigation assistance system 112 includes an example communications interface 1202, an example region model generator 1204, an example travel path generator 1206, an example local navigation data analyzer 1208, and an example database 1210.

The example communications interface 1202 of the illustrated example enables the navigation assistance system 112 to communicate with the robot 102 via the network 116. In some examples, the communications interface 1202 transmits or provides navigation assistance data to the robot 102 to enable the robot to navigate through the environment 100. As described above, in some examples, the navigation assistance data includes an indication of navigation regions 118 within the environment 100 that define a travel path the robot 102 is to follow to arrive at a desired destination. In some examples, the navigation assistance data provided via the communications interface 1202 also includes neural network models associated with navigation regions 118 along the travel path for the robot 102. Further, in some examples, additional neural network models associated with additional regions 118 may be provided to enable the robot 102 to have access to such models in the event the travel path needs to be updated or rerouted through different regions due to unanticipated obstacles and/or for any other reason.

Additionally, the example communications interface 1202 may also receive local navigation data from the robot 102 as it navigates through the environment 100. In some examples, the local navigation data includes information indicative of the position and orientation of the robot 102 relative to the center point of the region 118 in which the robot 102 is currently navigating. In some examples, the local navigation data may also include an indication of the current region 118 in which the robot 102 is navigating and/or an indication of the associated model the robot 102 is currently using to navigate. Further, in some examples, the local navigation data may include obstacle detection information indicating that the robot 102 has detected an obstacle in the designated travel path for the robot and/or requesting a new travel path to avoid such an obstacle.

Independent of communications with the robot 102, the example communications interface 1202 also receives model generation data that may be used to generate the neural network models for the different navigation regions 118. In some examples, the model generation data is stored in the database 1210 for subsequent analysis as described below. In some examples, the model generation data include images of the environment 100 along with location data indicating the location within the environment 100 at which the images were captured. In some examples, multiple images are captured from within each designated region 118 for which a model is to be generated. Furthermore, in some examples, the multiple images captured within each region 118 are captured from relatively homogenously distributed locations within the region so that many different perspectives of the environment 100 as captured from within the region 118 are represented by the collected images. Further still, in some examples, a sufficient number of images (e.g., 500, 1000, 3000, 5000, etc.) are captured from within each region 118 to provide a relatively large data set from which a model can be generated.

The images and corresponding location data used to generate the models for each region 118 may be captured and/or collected in any suitable matter. In some examples, the images are captured by one or more UAVs and/or ground-based robots navigating through the environment 100 based on any suitable navigation techniques (e.g. SLAM) that enables such robots to record their position relative to the environment 100 at the time that images of the environment 100 are captured. Such navigation techniques may involve the robots creating and/or using a map of the entire environment 100 and/or capturing images of subject matter of a private or otherwise sensitive nature. However, during this initial model generation, privacy is a relatively small concern because such robots are likely owned and/or operated by the entity that owns, possesses, and/or manages the premises being mapped.

The navigation of robots within the environment 100 to capture images with associated location data typically involves relatively significant processing power and/or may take a relatively significant amount of time. However, the process of capturing images for purposes of model generation only needs to be performed a single time. Once the images have been captured and subsequently analyzed to produce models for each region in the environment 100, any robot that needs to navigate within the environment 100 may rely on the models as disclosed herein without needing to create or have access to a map of the environment. As a result, while there may be a relatively significant computational burden upfront, this process significantly reduces the computational burdens on other robots that navigate in the same environment later on because such robots do not need to generate a full map or engage in the complex navigational techniques employed in the past.

In the illustrated example of FIG. 12, the navigation assistance system 112 includes the region model generator 1204 to generate models for different navigation regions 118 designated within the environment 100 based on the model generation data (e.g., images and corresponding location data) collected as described above. In some examples, the region model generator 1204 also identifies and/or designates the locations for the different regions 118 in conjunction with input from a user. For instance, in some examples, the region model generator 1204 may be provided with a map of the environment 100 (or a portion thereof) and then subdivide the environment 100 into overlapping regions 118 having a shape (e.g., a circle) and/or dimensions (e.g., a diameter) identified by a user. In some examples, the shape and/or dimensions of the regions may be specified by default. As disclosed above, the region model generator 1204 may designate the regions 118 to overlap such that the center points of two adjacent regions are within the boundaries of each other. In some examples, the region model generator 1204 may omit certain areas of the environment 100 from being assigned a navigation region 118 based on a user identifying such areas as restricted or off limits for autonomous navigation (e.g., due to safety concerns, privacy concerns, and/or security concerns, etc.). Additionally or alternatively, in some examples, certain areas of the environment 100 may be omitted from being assigned a navigation region 118 based on data from the devices capturing the initial model generation data used in generating models for the regions 118 indicating that the areas contain an obstacle. Additionally or alternatively, the areas containing obstacles for which no navigation region 118 is to be designated may be identified by a user.

Once the navigation regions 118 within the environment 100 have been identified, the example region model generator 1204 retrieves all model generation data corresponding to a particular region 118 (e.g., the images captured from within the region along with the associated location data) and analyzes the data to generate or train a neural network model for the region. This process may be repeated for each region 118 designated in the environment 100. Inasmuch as the regions 118 overlap, the same model generation data may be used in generating multiple different models. In some examples, the generated models are stored in the database 1210 for future reference. Further, in some examples, once the models have been generated the model generation data used to generate the models may be discarded.

In the illustrated example of FIG. 12, the travel path generator 1206 identifies a sequence or series of overlapping regions 118 within the environment 100 that define a travel path for a robot (e.g., the robot 102) to navigate within the environment 100 from a current location of the robot 102 to a final destination (e.g., the final destination 126). The particular series of regions 118 may be determined in any suitable matter and is made possible by the fact that the travel path generator 1206 has access to a full map of the environment 100 and information indicating the positional relationship of the different regions 118 and their relationship to the environment 100. While this information is available to the navigation assistance system 112, this information is not provided to the robot 102. Rather, the travel path generator 1206 merely provides (via the communications interface 1202) the sequence of the regions without specifying their particular relationship to each other or the environment 100. As a result, the robot 102 does not receive any information that could be used to determine a complete map of the environment, thereby alleviating concerns of privacy when the robot 102 is owned by a third party entity. In some examples, the travel path generator 1206 may also identify additional regions adjacent the series of regions that define the travel path for the robot 102 so that the models associated with such regions may be provided to the robot 102 to be available in the event the robot 102 needs to change course while navigating through the environment 100.

In the illustrated example of FIG. 12, the local navigation data analyzer 1208 analyzes local navigation data received from the robot 102 as it navigates through the environment. As mentioned above, local navigation data includes information indicative of the position (e.g., distance) and orientation (e.g., angle) of the robot 102 relative to a center point of the region 118 in which the robot is currently navigating. In some examples, based on an analysis of such data, the local navigation data analyzer 1208 determines when to identify and/or provide subsequent models to the robot 102 to enable the robot to continue navigating towards a final destination 126. For instance, in some examples, the local navigation data analyzer 1208 may determine when the robot 102 reaches (or comes within a threshold distance of) the center point of one region 118 to then identify the next region 118 (that overlaps the center point) in which the robot 102 is to navigate. In some examples, multiple regions in the sequence may be identified at a single point in time so that the robot 102 is able to determine the next model to use as it advances from region to region without further input from the navigation assistance system 112.

Additionally, in some examples, the location navigation data may include obstacle detection information indicating that the robot 102 has identified an obstacle along the travel path determined by the travel path generator 1206. In some such examples, the local navigation data analyzer 1208 may determine that a new travel path needs to be generated that provides a detour around the detected obstacle. In some examples, this determination may be made by the robot 102 such that the robot transmits a request that is provided directly to the travel path generator 1206 to provide a new travel path.

While an example manner of implementing the navigation assistance system 112 of FIG. 1 is illustrated in FIG. 12, one or more of the elements, processes and/or devices illustrated in FIG. 12 may be combined, divided, re-arranged, omitted, eliminated and/or implemented in any other way. Further, the example communications interface 1202, the example region model generator 1204, the example travel path generator 1206, the example local navigation data analyzer 1208, the example database 1210, and/or, more generally, the example navigation assistance system 112 of FIG. 1 may be implemented by hardware, software, firmware and/or any combination of hardware, software and/or firmware. Thus, for example, any of the example communications interface 1202, the example region model generator 1204, the example travel path generator 1206, the example local navigation data analyzer 1208, the example database 1210 and/or, more generally, the example navigation assistance system 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 1202, the example region model generator 1204, the example travel path generator 1206, the example local navigation data analyzer 1208, and/or the example database 1210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example navigation assistance system 112 of FIG. 1 may include one or more elements, processes and/or devices in addition to, or instead of, those illustrated in FIG. 12, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13:
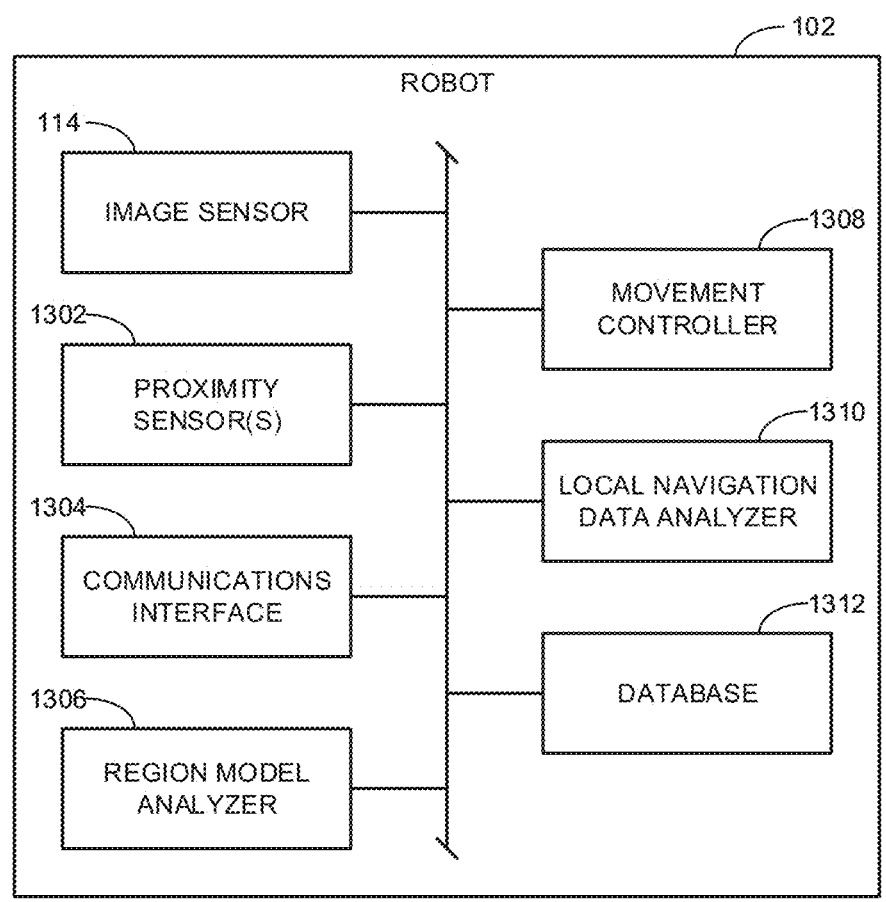
FIG. 13 is a block diagram illustrating an example implementation of the robot of FIG. 1.

FIG. 13 is a block diagram illustrating an example implementation of the robot 102 of FIG. 1. In the illustrated example of FIG. 13, the robot 102 includes the example image sensor 114, one or more example proximity sensor(s) 1302, an example communications interface 1304, an example region model analyzer 1306, an example movement controller 1308, an example local navigation data analyzer 1310, and an example database 1312.

As described above, the example image sensor 114 may be a camera that points in a particular direction. In some examples, the image sensor 114 points upwards to capture images of a ceiling of the environment 100. In this manner, there is relatively little concern that the image sensor 114 on a robot 102 owned by a third party entity will capture images containing subject matter of a sensitive or private nature. The example proximity sensor(s) 1302 enable the robot 102 to detect obstacles in its immediate vicinity. In some examples, the obstacles may be detected based on analysis of images captured by the image sensor 114 such that the proximity sensor(s) 1302 may be omitted. However, in other examples, the proximity sensor(s) operate independent of the image sensor 114.

The example communications interface 1304 enables communications with the navigation assistance system 112 via the network 116. In some examples, the communications interface 1304 receives navigation assistance data from the navigation assistance system 112 and provides local navigation data back to the navigation assistance system 112 as discussed above in connection with the communications interface 1202 of FIG. 12. In some examples, the models received from the navigation assistance system 112 are stored in the example database 1312 for subsequent use as needed.

The example region model analyzer 1306 analyzes or evaluates a particular model associated with a particular region 118 in the environment 100 in connection with an image captured by the image sensor 114. In some examples, the particular model to be evaluated is based on the sequence of overlapping regions 118 corresponding to the travel path designated by the navigation assistance system 112. The region model analyzer 1306 determines the distance of the robot 102 from and angle of the robot 102 relative to the center point of the region 118 associated with the model being evaluated. Based on these outputs, the example movement controller 1308 controls movement of the robot 102 towards the center point of the region 118. In some examples, the region model analyzer 1306 determines when a particular model stored in the database 1312 is no longer needed so that the model can be discarded to free up memory for subsequent models that may be needed.

The example local navigation data analyzer 1310 analyzes local navigation data to determine when the region model analyzer 1306 is to switch to evaluating the next model associated with the next region 118 in the travel path defined by the navigation assistance system 112. In some examples, the local navigation data analyzer 1310 determines when to download and/or request additional models associated with subsequent regions through which the robot 102 is to navigate. In some examples, the local navigation data analyzer 1310 determines when a new travel path is need because an obstacle has been detected in the current travel path based on feedback from the proximity sensor(s) 1302. The functionality of the local navigation data analyzer 1310 of FIG. 13 is similar to the local navigation data analyzer 1208 of FIG. 12. Accordingly, in some examples, the functionality is divided between the local navigation data analyzer 1310 of FIG. 13 and the local navigation data analyzer 1208 of FIG. 12. In some examples, all of the functionality described herein is performed by one of the local navigation data analyzer 1310 of FIG. 13 and the local navigation data analyzer 1208 of FIG. 12, while the other is omitted. In other examples, both the local navigation data analyzer 1310 of FIG. 13 and the local navigation data analyzer 1208 of FIG. 12 perform the same functions and, thus, aspect may be redundant to one another.

While an example manner of implementing the robot 102 of FIG. 1 is illustrated in FIG. 13, one or more of the elements, processes and/or devices illustrated in FIG. 13 may be combined, divided, re-arranged, omitted, eliminated and/or implemented in any other way. Further, the example image sensor 114, the example proximity sensor(s) 1302, the example communications interface 1304, the example region model analyzer 1306, the example local navigation data analyzer 1310, the example movement controller 1308, the example database 1312 and/or, more generally, the example robot 102 of FIG. 1 may be implemented by hardware, software, firmware and/or any combination of hardware, software and/or firmware. Thus, for example, any of the example image sensor 114, the example proximity sensor(s) 1302, the example communications interface 1304, the example region model analyzer 1306, the example local navigation data analyzer 1310, the example movement controller 1308, the example database 1312 and/or, more generally, the example robot 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image sensor 114, the example proximity sensor(s) 1302, the example communications interface 1304, the example region model analyzer 1306, the example local navigation data analyzer 1310, the example movement controller 1308, and/or the example database 1312 is/are hereby expressly defined to include a non-transitory computer readable storage device or storage disk such as a memory, a digital versatile disk (DVD), a compact disk (CD), a Blu-ray disk, etc. including the software and/or firmware. Further still, the example robot 102 of FIG. 1 may include one or more elements, processes and/or devices in addition to, or instead of, those illustrated in FIG. 13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
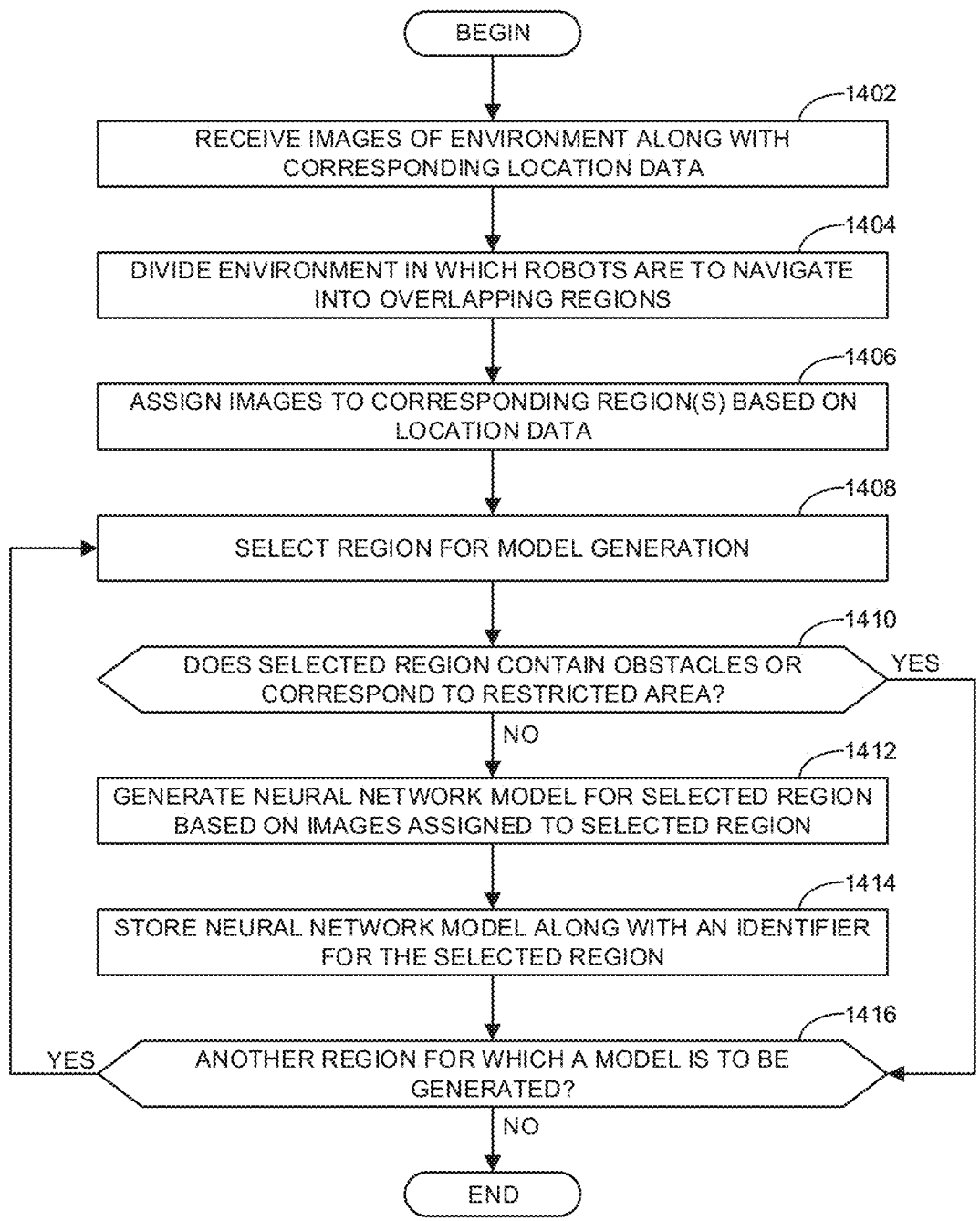
FIGS. 14 and 15 are flowcharts representative of example machine readable instructions that may be executed to implement the example navigation assistance system of FIGS. 1 and/or 12.
Figure 15:
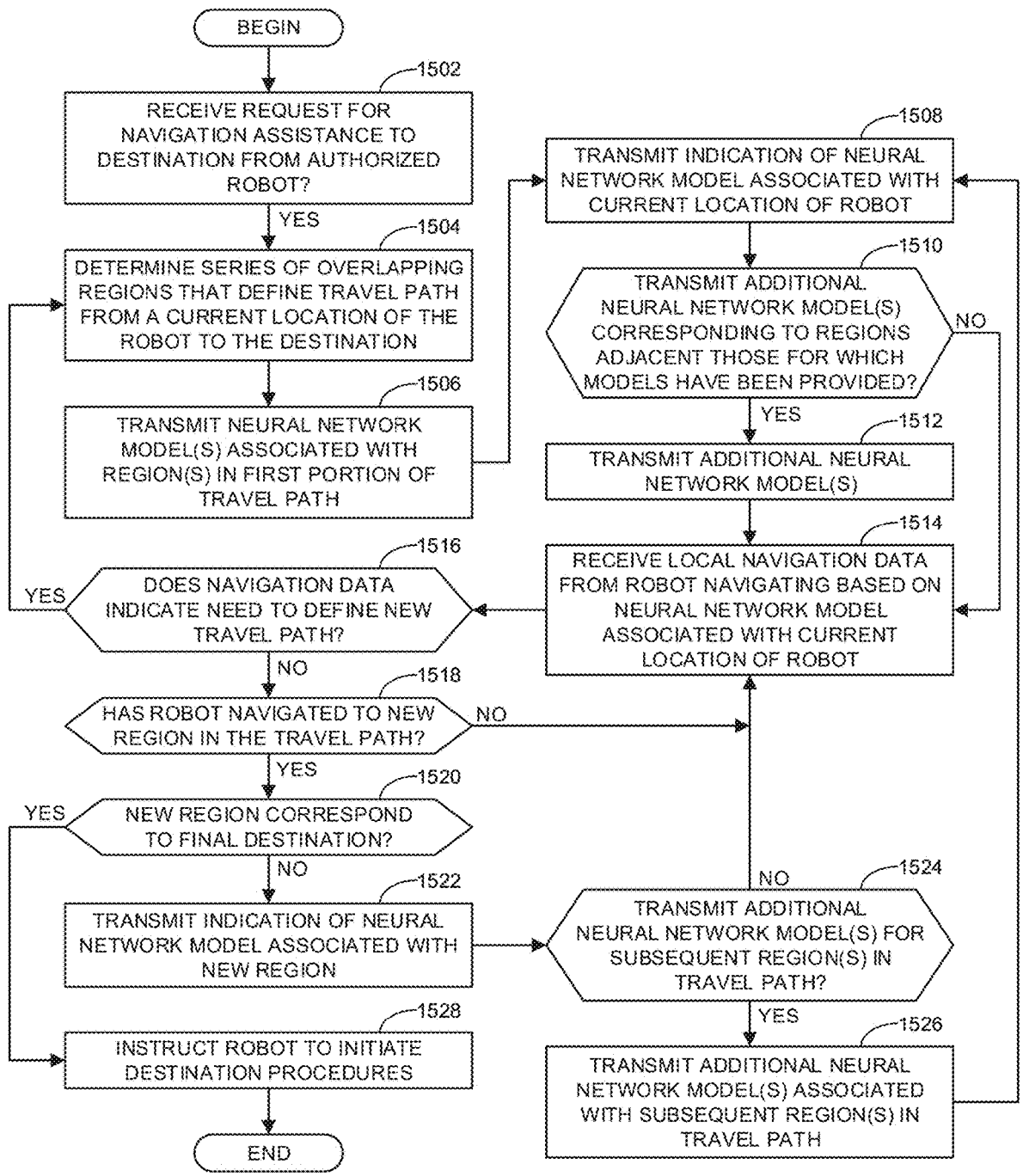

Flowcharts representative of example hardware logic, machine readable instructions, hardware implemented state machines, and/or any combination thereof for implementing the navigation assistance system 112 of FIGS. 1 and/or 12 are shown in FIGS. 14 and 15. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 14 and 15, many other methods of implementing the example navigation assistance system 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Turning in detail to the flowcharts, FIG. 14 is a flowchart representative of example machine readable instructions that may be implemented by the example navigation assistance system 112 to initially generate neural network models for regions in an environment (e.g., the environment 100 of FIG. 1). The example process begins at block 1402 where the example communications interface 1202 receives images of the environment along with corresponding location data. At block 1404, the example region model generator 1204 divides the environment 100 in which robots are to navigate into overlapping regions (e.g., the regions 118 of FIG. 1). At block 1406, the example region model generator 1204 assigns the images to corresponding region(s) 118 based on the location data. In some examples, the same image may be assigned to more than one region 118. At block 1408, the example region model generator 1204 selects a region 118 for model generation. At block 1410, the example region model generator 1204 determines whether the selected region 118 contains obstacles (e.g., the obstacle(s) 124 of FIG. 1 or the obstacle 502 of FIG. 5) or corresponds to a restricted area (e.g., the second room 110 of FIG. 1). In some examples, this determination is made based on data provided along with the images and location data. Additionally or alternatively, obstacles and/or restricted areas may be identified by a user. If the example region model generator 1204 determines that the selected region 118 does not contain obstacles or corresponds to a restricted area, control advances to block 1412.

At block 1412, the example region model generator 1204 generates a neural network model for the selected region 118 based on the images assigned to the selected region 118 and their corresponding locations within the region 118. At block 1414, the example database 1210 stores the neural network model along with an identifier (e.g., the identifier 120 of FIG. 1) for the selected region 118. At block 1416, the example region model generator 1204 determines whether there is another region 118 for which a model is to be generated. If so, control returns to block 1408. Returning to block 1410, if the example region model generator 1204 determines the selected region contains obstacles or corresponds to a restricted area, control advances directly to block 1416. If the example region model generator 1204 determines there are no more regions 118 for which a model is to be generated (block 1416), the example process of FIG. 14 ends.

FIG. 15 is a flowchart representative of example machine readable instructions that may be implemented by the example navigation assistance system 112 to assist a robot (e.g., the robot 102 of FIG. 1) in navigating through an environment (e.g., the environment 100 of FIG. 1). The example process begins at block 1502 where the example communications interface 1202 receives a request for navigation assistance to a destination (e.g., the final destination 126 of FIG. 1) from an authorized robot (e.g., the robot 102 of FIG. 1). In this example, any autonomously controlled robot may be authorized based on security requirements of the entity managing the premises in which the robot 102 seeks to navigate. In some examples, authorization may be based on a password login or registration before navigation assistance data is provided.

At block 1504, the example travel path generator 1206 determines a series of overlapping regions (e.g., the regions 118) that define a travel path (e.g., the travel path 402 of FIG. 4) from a current location of the robot 102 to the destination 126. In some examples, the current location of the robot 102 may be provided in the request received at block 1502. At block 1506, the example communications interface 1202 transmits neural network model(s) associated with the region(s) 118 in a first portion of the travel path 402. In some examples, the models are stored in the example database 1210 as generated based on the process outlined above in connection with FIG. 14. In some examples, the first portion of the travel path 402 at block 1504 of FIG. 15 corresponds to a single region 118. That is, in some examples, only one model is transmitted at time. In some examples, the first portion of the travel path 402 corresponds to the entire travel path such that models corresponding to every region 118 in the entire travel path are transmitted to the robot 102. In some examples, the first portion of the travel path 402 corresponds to more than one region 118 but less than all regions along the path. At block 1508, the example communications interface 1202 transmits an indication of the neural network model associated with the current location of the robot 102. In some examples, the communications interface 1202 also transmits an indication of subsequent models associated with subsequent regions in the travel path 402 according to the sequence or order of regions 118 through which the robot 102 is to navigate.

At block 1510, the example travel path generator 1206 determines whether to transmit additional neural network model(s) corresponding to regions adjacent those for which models have already been provided. If so, control advances to block 1512 where the example communications interface 1202 transmits the additional neural network model(s). Thereafter, control advances to block 1514. If no additional models are to be transmitted (block 1510), control advances directly to block 1514. At block 1514, the communications interface 1202 receives location navigation data from the robot 102 navigating based on the neural network model associated with the current location of the robot 102 (e.g., the region 118 in which the robot 102 is currently navigating).

At block 1516, the example local navigation data analyzer 1208 determines whether the navigation data indicates a need to define a new travel path. In some examples, this determination is made based on obstacle detection information included in the local navigation data received at block 1514. In some examples, this determination may be made by the robot 102 and indicated in the local navigation data received at block 1514. If a new travel path is needed, control returns to block 1504. If there is no need for a new travel path, control advances to block 1518 where the example local navigation data analyzer 1208 determines whether the robot 102 has navigated to a new region 118 in the travel path. In some examples, this determination is made based on whether the distance of the robot 102 from the center point of the region 118 in which the robot is navigating satisfies a threshold. In some examples, as with block 1516, the determination at block 1518 may be determined and reported by the robot 102 without the need for further analysis by the local navigation data analyzer 1208. If the robot 102 has not navigated to a new region 118, control returns to block 1514 to receive additional location navigation data (e.g., reported at a later point in time after the robot 102 has moved closer to the center point of the current region 118 in which it is navigating).

If the robot 102 has navigated to a new region (block 1518), control advances to block 1520 where the example travel path generator 1206 determines whether the new region 118 corresponds to the final destination 126. If so, the example communications interface 1202 transmits an indication of the neural network model associated with the new region 118. In some examples, the determination at block 1520 may be made by the robot 102 if the navigation assistance system 112 previously provided an indication of subsequent regions 118 in the sequence of regions 118 defining the travel path. In such examples, block 1522 may be omitted because the robot 102 will already have the needed information to identify the model associated with the new region.

At block 1524, the example travel path generator 1206 determines whether to transmit additional neural network model(s) for subsequent region(s) 118 in the travel path 402. If so, control advances to block 1526 where the example communications interface 1202 transmits the additional neural network model(s) associated with the subsequent region(s) 118 in the travel path 402. Thereafter, control returns to block 1508. If the example travel path generator 1206 determines that no additional models are to be transmitted at block 1524 (e.g., the robot 102 has already been provided subsequent models for the new region and/or subsequent regions thereafter), control returns to block 1514.

Returning to block 1520, if the example travel path generator 1206 determines that the new region 118 corresponds to the final destination 126, control advances to block 1528 where the example communications interface 1202 instructs the robot 102 to initiate destination procedures. Thereafter, the example process of FIG. 15 ends. As mentioned above, in some examples, the determination at block 1520 may be made by the robot 102. In such examples, block 1528 may be omitted.

Figure 16:
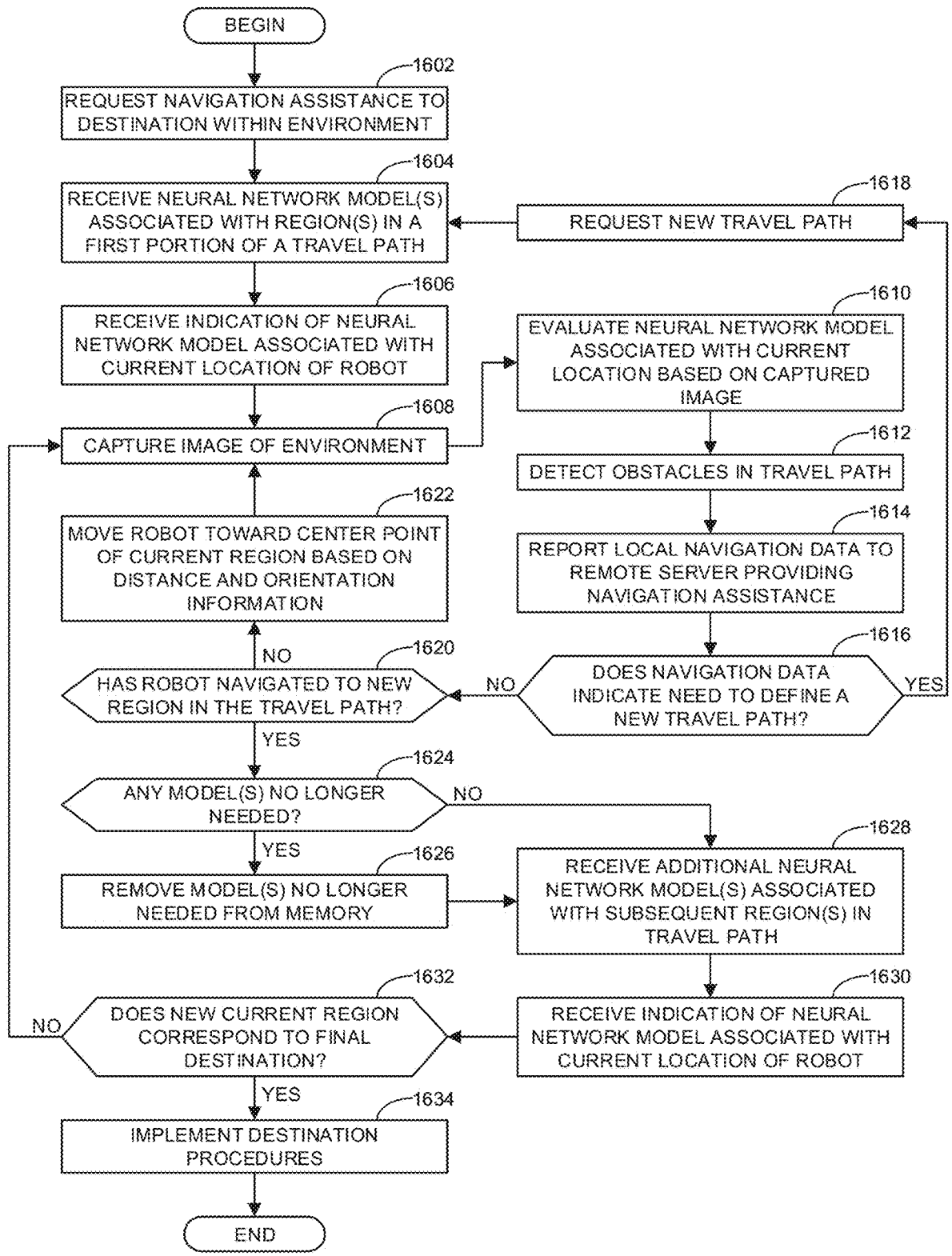
FIG. 16 is a flowchart representative of example machine readable instructions that may be executed to implement the example robot of FIGS. 1 and/or 13.

A flowchart representative of example hardware logic, machine readable instructions, hardware implemented state machines, and/or any combination thereof for implementing the robot 102 of FIGS. 1 and/or 13 is shown in FIG. 16. The machine readable instructions may be one or more executable programs or portion(s) of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowchart illustrated in FIG. 16, many other methods of implementing the example robot 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 16 is a flowchart representative of example machine readable instructions that may be implemented by the example robot 102 to navigate through the environment 100 based on assistance from the navigation assistance system 112. That is, in some examples, the navigation assistance system 112 implements the process of FIG. 15 concurrently with the robot 102 implementing the process of FIG. 16.

The example process of FIG. 16 begins at block 1602 where the example communications interface 1304 requests navigation assistance to a destination (e.g., the final destination 126 of FIG. 1) within an environment (e.g., the environment 100 of FIG. 1). At block 1604, the example communications interface 1304 receives neural network model(s) associated with region(s) (e.g., the regions 118 of FIG. 1) in a first portion of a travel path (e.g., the travel path 402 of FIG. 4). In some examples, the models received include those associated with the regions 118 that define the travel path 402. Additionally, in some examples, the models received may also include additional models corresponding to regions 118 adjacent the regions 118 directly along the travel path 402. At block 1606, the communications interface 1304 receives an indication of the neural network model associated with the current location of the robot 102. In some examples, the communications interface 1304 also receives an indication of subsequent models associated with subsequent regions 118 in the travel path 402 according to the sequence or order of the regions 118 through which the robot 102 is to navigate. At block 1608, the example image sensor 114 captures an image of the environment 100. At block 1610, the example region model analyzer 1306 evaluates the neural network model associated with the current location based on the captured image. As described above, the evaluation of the model generates two outputs indicating the position and orientation (e.g., distance and angle) of the robot 102 relative to the center point of the region 118 in which the robot 102 is currently navigating. At block 1612, the example proximity sensor(s) 1302 detect obstacles in the travel path 402. Additionally or alternatively, in some examples, obstacles may be detected based on an analysis of the image captured at block 1608.

At block 1614, the example communications interface 1304 reports local navigation data to a remote server providing navigation assistance (e.g., the navigation assistance system 112 of FIG. 1). In some examples, the local navigation data includes the results of the model evaluation (at block 1610) and the obstacle detection (at block 1612). At block 1616, the example local navigation data analyzer 1310 determines whether the navigation data indicates a need to define a new travel path. If so, control advances to block 1618 where the example communications interface 1304 requests a new travel path. In some examples, the determination at block 1616 is implemented by the navigation assistance system 112. In some such examples, block 1618 may be omitted. If a new travel path is not needed (block 1616), control advances to block 1620 where the example local navigation data analyzer 1310 determines whether the robot 102 has navigated to a new region 118 in the travel path 402. In some examples, this determination is made based on whether the distance of the robot 102 from the center point of the region 118 in which the robot is navigating satisfies a threshold. If the robot 102 has not navigated to a new region 118, control advances to block 1622 where the example movement controller 1308 moves the robot toward the center point of the current region 118 based on the distance and orientation information. Thereafter, control returns to block 1608 to capture another image and repeat the process.

If the local navigation data analyzer 1310 determines that the robot 102 has navigated to a new region in the travel path (block 1620), control advances to block 1624. At block 1624, the example model region analyzer 1306 determines whether any model(s) are no longer needed. In some examples, a model may no longer be needed if the robot 102 has navigated through the region 118 associated with the model and has begun navigating based on a subsequent model associated with a subsequent region. However, in some examples, models may be retained to enable the robot 102 to navigate back through the travel path in the reverse direction and/or retrace a part of the travel path to follow a detour when needed. If the example region model analyzer 1306 determines that one or more models are no longer needed, control advances to block 1626 where the example database 1312 removes the model(s) that are no longer needed from memory. Thereafter, control advances to block 1628. If no models are identified to be removed from memory (block 1624), control advances directly to block 1628. At block 1628, the example communications interface 1304 receives additional neural network model(s) associated with subsequent region(s) 118 in the travel path 402. At block 1630, the example communications interface 1304 receives an indication of the neural network model associated with the current location of the robot (e.g., the new region entered into as determined at block 1620). In some iterations of the example process, block 1628 and/or block 1630 may be omitted if such information has already been received by the example communications interface 1304.

At block 1632, the example region model analyzer 1306 determines whether the new current region 118 corresponds to the final destination 126. In some examples, this determination is made based on a communication from the navigation assistance system 112 indicating that such is the case. In other examples, the determination at block 1632 is determined based on information previously transmitted from the navigation assistance system 112. If the new region 118 is not the final destination 126, control returns to block 1608 to repeat the process. If the new region 118 does correspond to the final destination 126, control advances to block 1634 where the example robot 102 implements a destination procedure. The destination procedure may include any suitable procedure corresponding to the purpose for which the robot 102 navigated to the destination 126. Thereafter, the example process of FIG. 16 ends.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 14-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 17:
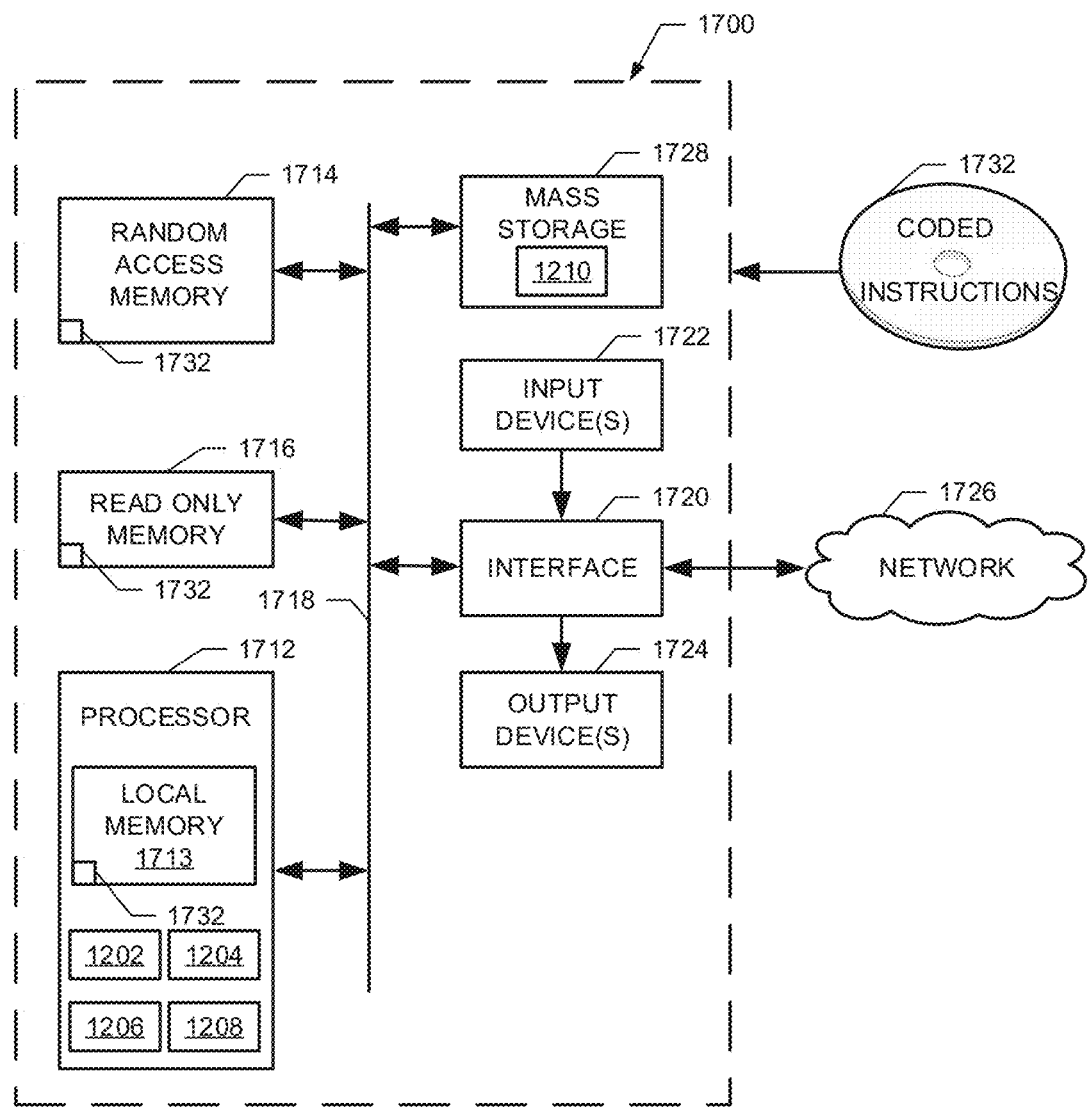
FIG. 17 is a block diagram of an example processing platform structured to execute the example instructions of FIGS. 14 and 15 to implement the example navigation assistance system of FIGS. 1 and/or 12.

FIG. 17 is a block diagram of an example processor platform 1700 structured to execute the instructions of FIGS. 14 and 15 to implement the navigation assistance system 112 of FIGS. 1 and/or 12. The processor platform 1700 can be, for example, a server, a personal computer, a workstation, a self-learning machine (e.g., a neural network), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 1202, the example region model generator 1204, the example travel path generator 1206, and the example local navigation data analyzer 1208.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives. In this example, the mass storage devices 1728 implements the example database 1210.

The machine executable instructions 1732 of FIGS. 14 and 15 may be stored in the mass storage device 1728, in the volatile memory 1714, in the non-volatile memory 1716, and/or on a removable non-transitory computer readable storage medium such as a CD or DVD.

Figure 18:
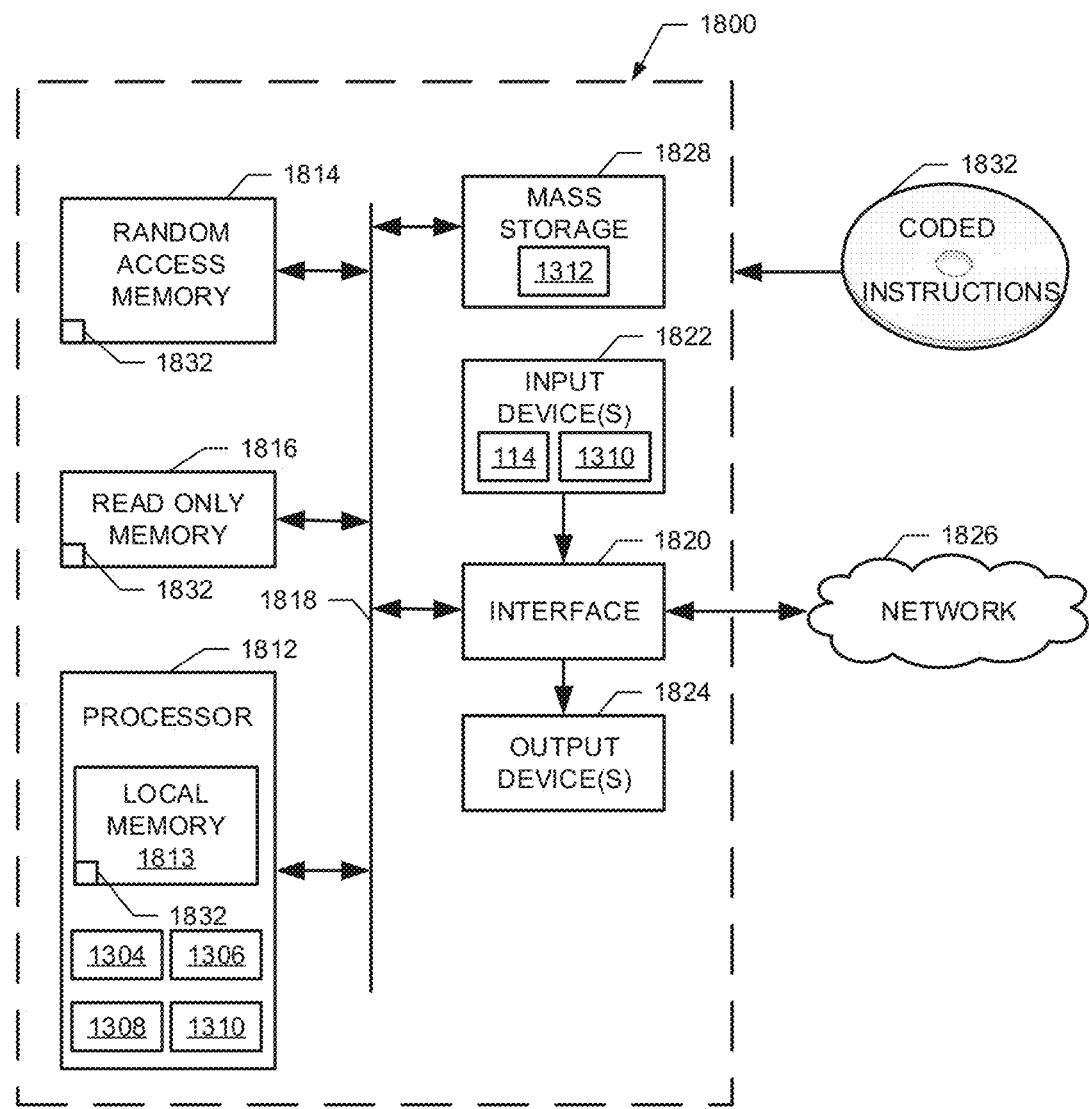
FIG. 18 is a block diagram of an example processing platform structured to execute the example instructions of FIG. 16 to implement the example robot of FIGS. 1 and/or 13.

FIG. 18 is a block diagram of an example processor platform 1800 structured to execute the instructions of FIG. 16 to implement the robot 102 of FIGS. 1 and/or 13. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 1304, the example region model analyzer 1306, the example local navigation data analyzer 1310, and the example movement controller 1308.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(S) 1822 include the example image sensor 114 and the example proximity sensor(s) 1302.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives. In this example, the mass storage device 1828 implements the example database 1312.

The machine executable instructions 1832 of FIG. 16 may be stored in the mass storage device 1828, in the volatile memory 1814, in the non-volatile memory 1816, and/or on a removable non-transitory computer readable storage medium such as a CD or DVD.

From the foregoing, it will be appreciated that example methods, apparatus and articles of manufacture have been disclosed that enable robots to autonomously navigate through environments without a map of the environment or any prior information regarding the layout of the environment and/or obstacles within the environment in a computationally efficient manner and without needing large amounts of memory or communication bandwidth. The disclosed methods, apparatus and articles of manufacture improve the efficiency of using a computing device by pre-processing or generating multiple relatively small neural network models for separate relatively small overlapping regions within the environment of interest. Successive ones of these models are provided to a robot to be used in sequence to enable the robot to navigate from one region to the next through an entire travel path within the environment to any desired destination. The small size of each model significantly reduces the processing requirements of the robot to evaluate each model. Furthermore, separate ones of the models can be downloaded at different points in time as the robot navigates through the environment with only the models that are needed at any given time being stored in memory thereby reducing the memory and communication bandwidth requirements for the robot. The disclosed methods, apparatus and articles of manufacture are accordingly directed to one or more improvement(s) in the functioning of a computer. Furthermore, examples disclosed herein are advantageous to enable robots owned by third party entities to navigate within an environment without significant privacy and/or security concerns because the robots navigate based on limited information that is insufficient to establish a map of the environment and/or capture images of sensitive or private subject matter.

Example methods, apparatus, systems, and articles of manufacture to facilitate autonomous navigation of robotic devices are disclosed herein. Further examples and combinations thereof include the following:

Example 1 includes an autonomous robot, comprising a region model analyzer to: analyze a first image of an environment based on a first neural network model, the first image captured by an image sensor of the robot when the robot is in a first region of the environment, the first neural network associated with the first region, and analyze a second image of the environment based on a second neural network model, the second image captured by the image sensor when the robot is in a second region of the environment, the second neural network associated with the second region; and a movement controller to autonomously control movement of the robot within the first region toward the second region based on the analysis of the first image, and autonomously control movement of the robot within the second region based on the analysis of the second image.

Example 2 includes the autonomously controlled robot of example 1, wherein the first region overlaps the second region, the first and second regions defining different portions of a travel path for the robot to navigate through the environment.

Example 3 includes the autonomously controlled robot of example 2, further including a communications interface to, in response to an obstacle along the travel path, request a new travel path from a remote server, the new travel path defined by different regions within the environment, the movement controller to autonomously control movement of the robot along the new travel path based on different neural network models respectively associated with the different regions.

Example 4 includes the autonomously controlled robot of example 3, wherein the communications interface is to receive the different neural network models before detection of the obstacle.

Example 5 includes the autonomously controlled robot of any one of examples 1-3, wherein a center point of the first region is located within the second region.

Example 6 includes the autonomously controlled robot of example 5, wherein the movement controller is to autonomously control movement of the robot toward the second region by controlling movement of the robot toward the center point of the first region.

Example 7 includes the autonomously controlled robot of example 6, wherein the movement controller is to begin controlling movement of the robot within the second region based on the second neural network model in response to the robot being within a threshold distance of the center point of the first region.

Example 8 includes the autonomously controlled robot of any one of examples 1-7, wherein the region model analyzer is to determine a distance between a current location of the robot and a center point of the first region, and determine an orientation of the robot relative to the center point, the movement controller to autonomously control movement of the robot based on the distance and the orientation.

Example 9 includes the autonomously controlled robot of any one of examples 1-8, further including a communications interface to, in response to the robot entering the second region, access a third neural network model from a remote server while the robot is moving through the second region, the third neural network model associated with a third region within the environment.

Example 10 includes the autonomously controlled robot of example 9, wherein the region model analyzer is to remove the first neural network model from memory after the robot enters the second region.

Example 11 includes the autonomously controlled robot of any one of examples 1-10, wherein the robot is to navigate through the environment without a map of the environment.

Example 12 includes the autonomously controlled robot of any one of examples 1-11, wherein the environment is an indoor environment.

Example 13 includes the autonomously controlled robot of example 12, wherein the image sensor is directed upward such that the first and second images include a ceiling of the indoor environment.

Example 14 includes a non-transitory computer readable medium comprising instructions that, when executed, cause a robot to at least capture, with an image sensor, a first image of an environment from within a first region of the environment, autonomously move within the first region toward a second region within the environment based on the first image and a first neural network model associated with the first region, capture, with the image sensor, a second image corresponding to the second region, and autonomously move within the second region based on the second image and a second neural network model associated with the second region.

Example 15 includes the non-transitory computer readable medium of example 14, wherein the first region overlaps the second region, the first and second regions defining different portions of a travel path for the robot to navigate through the environment.

Example 16 includes the non-transitory computer readable medium of example 15, wherein the instructions further cause the robot to respond to an obstacle along the travel path by requesting a new travel path from a remote server, the new travel path defined by different regions within the environment, and autonomously move along the new travel path based on different neural network models associated with respective ones of the different regions.

Example 17 includes the non-transitory computer readable medium of example 16, wherein the instructions further cause the robot to download the different neural network models before detection of the obstacle.

Example 18 includes the non-transitory computer readable medium of any one of examples 14-17, wherein a center point of the first region is located within the second region.

Example 19 includes the non-transitory computer readable medium of example 18, wherein the instructions further cause the robot to autonomously move toward the second region by autonomously moving toward the center point of the first region.

Example 20 includes the non-transitory computer readable medium of example 19, wherein the movement within the second region based on the second neural network model begins in response to the robot being within a threshold distance of the center point of the first region.

Example 21 includes the non-transitory computer readable medium of any one of examples 14-20, wherein the instructions further cause the robot to determine a distance between a current location of the robot and a center point of the first region, determine an orientation of the robot relative to the center point, and autonomously move based on the distance and the orientation.

Example 22 includes the non-transitory computer readable medium of any one of examples 14-21, wherein the instructions further cause the robot to, in response to the robot entering the second region, download a third neural network model from a remote server while the robot is moving through the second region, the third neural network model associated with a third region within the environment.

Example 23 includes the non-transitory computer readable medium of example 22, wherein the instructions further cause the robot to remove the first neural network model from memory after the robot enters the second region.

Example 24 includes the non-transitory computer readable medium of any one of examples 14-23, wherein the robot is to navigate through the environment without a map of the environment.

Example 25 includes the non-transitory computer readable medium of any one of examples 14-24, wherein the environment is an indoor environment.

Example 26 includes the non-transitory computer readable medium of example 25, wherein the image sensor is directed upward such that the first and second images include a ceiling of the indoor environment.

Example 27 includes a method to autonomously control movement of a robot, the method comprising capturing, with an image sensor, a first image of an environment from within a first region of the environment, autonomously controlling movement of the robot within the first region toward a second region within the environment based on the first image and a first neural network model associated with the first region, capturing, with the image sensor, a second image corresponding to the second region, and autonomously controlling movement of the robot within the second region based on the second image and a second neural network model associated with the second region.

Example 28 includes the method of example 27, wherein the first region overlaps the second region, the first and second regions defining different portions of a travel path for the robot to navigate through the environment.

Example 29 includes the method of example 28, further including responding to an obstacle along the travel path by requesting a new travel path from a remote server, the new travel path defined by different regions within the environment, and autonomously controlling movement of the robot along the new travel path based on different neural network models associated with respective ones of the different regions.

Example 30 includes the method of example 29, further including downloading the different neural network models before detection of the obstacle.

Example 31 includes the method of any one of examples 27-30, wherein a center point of the first region is located within the second region.

Example 32 includes the method of example 31, further including autonomously controlling movement of the robot toward the second region by controlling movement of the robot toward the center point of the first region.

Example 33 includes the method of example 32, wherein the controlling movement of the robot within the second region begins based on the second neural network model in response to the robot being within a threshold distance of the center point of the first region.

Example 34 includes the method of any one of examples 27-33, further including determining a distance between a current location of the robot and a center point of the first region, determining an orientation of the robot relative to the center point, and autonomously controlling movement of the robot based on the distance and the orientation.

Example 35 includes the method of any one of examples 27-34, further including, in response to the robot entering the second region, downloading a third neural network model from a remote server while the robot is moving through the second region, the third neural network model associated with a third region within the environment.

Example 36 includes the method of example 35, further including removing the first neural network model from memory after the robot enters the second region.

Example 37 includes the method of any one of examples 27-36, wherein the robot is to navigate through the environment without a map of the environment.

Example 38 includes the method of any one of examples 27-37, wherein the environment is an indoor environment.

Example 39 includes the method of example 38, wherein the image sensor is directed upward such that the first and second images include a ceiling of the indoor environment.

Example 40 includes an apparatus to enable a robot to autonomously navigate through an environment, the apparatus comprising a travel path generator to identify a series of overlapping regions within the environment that define a travel path for the robot to navigate from a first location within the environment to a second location within the environment, different ones of the overlapping regions associated with respective ones of neural network models, and a communications interface to transmit the respective ones of the neural network models associated with the series of the overlapping regions to the robot, the robot to autonomously navigate within a first region in the series of the overlapping regions toward a second region in the series of the overlapping regions based on a first neural network model associated with the first region.

Example 41 includes the apparatus of example 40, wherein the communications interface is to transmit the first neural network model at a first point in time, and transmit a second neural network model at a second point in time after the first point in time, the second point in time to occur after the robot begins navigating through the first region.

Example 42 includes the apparatus of any one of examples 40 or 41, wherein the communications interface is to transmit additional neural network models associated with additional ones of the overlapping regions adjacent the overlapping regions in the identified series.

Example 43 includes the apparatus of any one of examples 40-42, wherein the communications interface is to transmit an indication of a sequence of the regions in the series of overlapping regions to the robot.

Example 44 includes the apparatus of any one of examples 40-43, wherein a center point of the first region is located within a boundary of the second region.

Example 45 includes the apparatus of example 44, wherein the robot is to autonomously navigate within the first region toward the second region by navigating toward the center point of the first region.

Example 46 includes the apparatus of any one of examples 44 or 45, wherein the communications interface is to obtain navigation data from the robot indicating the robot is within a threshold distance of the center point of the first region, and in response to the navigation data, instruct the robot to begin navigating within the second region based on a second one of the neural network models associated with the second region.

Example 47 includes the apparatus of any one of examples 40-46, further including a region model generator to assign images of the environment to ones of the overlapping regions based on location data associated with the images, the location data indicating locations within the environment where the images were captured, and generate different ones of the neural network models for the corresponding overlapping regions based on the images assigned to the different ones of the neural network models and the corresponding location data.

Example 48 includes the apparatus of example 47, wherein at least one of the neural network models is to enable the robot to determine (1) a distance between a current location of the robot within the corresponding region and the center point of the corresponding region and (2) an orientation of the robot relative to the center point of the corresponding region.

Example 49 includes the apparatus of any one of examples 40-48, wherein the communication interface is to obtain local navigation data from the robot indicating an obstacle in the travel path, the travel path generator to identify a new series of overlapping regions within the environment that defines a new travel path for the robot that avoids the detected obstacle, the communication interface to transmit an indication of a sequence of the regions in the new series of overlapping regions to the robot.

Example 50 includes a non-transitory computer readable medium comprising instructions that, when executed, cause a machine to at least identify a series of overlapping regions within an environment that define a travel path for a robot to navigate from a first location within the environment to a second location within the environment, different ones of the overlapping regions associated with respective ones of neural network models, and transmit the respective ones of the neural network models associated with the series of the overlapping regions to the robot, the robot to autonomously navigate within a first region in the series of the overlapping regions toward a second region in the series of the overlapping regions based on a first neural network model associated with the first region.

Example 51 includes the non-transitory computer readable medium of example 50, wherein the instructions further cause the machine to transmit the first neural network model at a first point in time, and transmit a second neural network model at a second point in time after the first point in time, the second point in time to occur after the robot begins navigating through the first region.

Example 52 includes the non-transitory computer readable medium of any one of examples 50 or 51, wherein the instructions further cause the machine to transmit additional neural network models associated with additional ones of the overlapping regions adjacent the overlapping regions in the identified series.

Example 53 includes the non-transitory computer readable medium of any one of examples 50-52, wherein the instructions further cause the machine to transmit an indication of a sequence of the regions in the series of overlapping regions to the robot.

Example 54 includes the non-transitory computer readable medium of any one of examples 50-53, wherein a center point of the first region is located within a boundary of the second region.

Example 55 includes the non-transitory computer readable medium of example 54, wherein the robot is to autonomously navigate within the first region toward the second region by navigating toward the center point of the first region.

Example 56 includes the non-transitory computer readable medium of any one of examples 54 or 55, wherein the instructions further cause the machine to obtain navigation data from the robot indicating the robot is within a threshold distance of the center point of the first region, and in response to the navigation data, instruct the robot to begin navigating within the second region based on a second one of the neural network models associated with the second region.

Example 57 includes the non-transitory computer readable medium of any one of examples 50-56, wherein the instructions further cause the machine to obtain images of the environment, assign ones of the images to ones of the overlapping regions based on location data associated with the images, the location data indicating locations within the environment where the images were captured, and generate different ones of the neural network models for the corresponding overlapping regions based on the images assigned to the different ones of the neural network models and the corresponding location data.

Example 58 includes the non-transitory computer readable medium of example 57, wherein at least one of the neural network models is to enable the robot to determine (1) a distance between a current location of the robot within the corresponding region and the center point of the corresponding region and (2) an orientation of the robot relative to the center point of the corresponding region.

Example 59 includes the non-transitory computer readable medium of any one of examples 50-58, wherein the instructions further cause the machine to obtain local navigation data from the robot indicating an obstacle in the travel path, identify a new series of overlapping regions within the environment that defines a new travel path for the robot that avoids the detected obstacle, and transmit an indication of a sequence of the regions in the new series of overlapping regions to the robot.

Example 60 includes a method to enable a robot to autonomously navigate through an environment, the method comprising identifying a series of overlapping regions within the environment that define a travel path for the robot to navigate from a first location within the environment to a second location within the environment, different ones of the overlapping regions associated with respective ones of neural network models, and transmitting the respective ones of the neural network models associated with the series of the overlapping regions to the robot, the robot to autonomously navigate within a first region in the series of the overlapping regions toward a second region in the series of the overlapping regions based on a first neural network model associated with the first region.

Example 61 includes the method of example 60, wherein the transmitting of the neural network models includes transmitting the first neural network model at a first point in time, and transmitting a second neural network model at a second point in time after the first point in time, the second point in time to occur after the robot begins navigating through the first region.

Example 62 includes the method of any one of examples 60 or 61, further including transmitting additional neural network models associated with additional ones of the overlapping regions adjacent the overlapping regions in the identified series.

Example 63 includes the method of any one of examples 60-62, further including transmitting an indication of a sequence of the regions in the series of overlapping regions to the robot.

Example 64 includes the method of any one of examples 60-63, wherein a center point of the first region is located within a boundary of the second region.

Example 65 includes the method of example 64, wherein the robot is to autonomously navigate within the first region toward the second region by navigating toward the center point of the first region.

Example 66 includes the method of any one of examples 64 or 65, further including obtaining navigation data from the robot indicating the robot is within a threshold distance of the center point of the first region, and in response to the navigation data, instructing the robot to begin navigating within the second region based on a second one of the neural network models associated with the second region.

Example 67 includes the method of any one of examples 60-66, further including obtaining images of the environment, assigning ones of the images to ones of the overlapping regions based on location data associated with the images, the location data indicating locations within the environment where the images were captured, and generating different ones of the neural network models for the corresponding overlapping regions based on the images assigned to the different ones of the neural network models and the corresponding location data.

Example 68 includes the method of example 67, wherein at least one of the neural network models is to enable the robot to determine (1) a distance between a current location of the robot within the corresponding region and the center point of the corresponding region and (2) an orientation of the robot relative to the center point of the corresponding region.

Example 69 includes the method of any one of examples 60-68, further including obtaining local navigation data from the robot indicating an obstacle in the travel path, identifying a new series of overlapping regions within the environment that defines a new travel path for the robot that avoids the detected obstacle, and transmitting an indication of a sequence of the regions in the new series of overlapping regions to the robot.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An autonomous robot, comprising:
at least one memory;
instructions in the robot, and
processor circuitry to execute the instructions a region model analyzer to:
analyze a first image of an environment based on a first neural network model, the first image captured by an image sensor of the robot when the robot is in a first region of the environment, the first neural network model used exclusively when the robot is in the first region;
analyze a second image of the environment based on a second neural network model, the second image captured by the image sensor when the robot is in a second region of the environment, the second neural network model used exclusively when the robot is in the second region;
autonomously control movement of the robot within the first region toward the second region based on the analysis of the first image; and
autonomously control movement of the robot within the second region based on the analysis of the second image.

2. The robot of claim 1, wherein the first region overlaps the second region, the first and second regions defining different portions of a travel path for the robot to navigate through the environment.

3. The robot of claim 2, wherein the processor circuitry is to:
in response to an obstacle along the travel path, request a new travel path from a remote server, the new travel path defined by different regions within the environment; and
autonomously control movement of the robot along the new travel path based on different neural network models respectively associated with the different regions.

4. The autonomously controlled robot of claim 3, wherein the processor circuitry is to receive the different neural network models before detection of the obstacle.

5. The robot of claim 2, wherein the travel path extends through a series of multiple different regions of the environment, each successive one of the multiple different regions in the series to overlap an immediately preceding one of the multiple different regions in the series, the multiple different regions including the first region, the second region, and other regions, each of the multiple different regions associated with a corresponding one of multiple different neural networks, the processor circuitry to control movement of the robot within each successive one of the multiple different regions in the series based on the corresponding one of the different neural networks.

6. The robot of claim 1, wherein the processor circuitry is to autonomously control movement of the robot by controlling movement of the robot from a current point within the first region toward a second point within the first region based on the analysis of the first image, the second point circumscribed by the second region.

7. The robot of claim 1, wherein a center point of the first region is located within the second region.

8. The robot of claim 7, wherein the processor circuitry is to autonomously control movement of the robot toward the second region by controlling movement of the robot toward the center point of the first region.

9. The robot of claim 8, wherein the processor circuitry is to begin controlling movement of the robot within the second region based on the second neural network model in response to the robot being within a threshold distance of the center point of the first region.

10. The robot of claim 1, wherein the processor circuitry is to:
determine a distance between a current location of the robot and a center point of the first region;
determine an orientation of the robot relative to the center point; and
autonomously control movement of the robot based on the distance and the orientation.

11. The robot of claim 1, wherein the processor circuitry is to, in response to the robot entering the second region, access a third neural network model from a remote server while the robot is moving through the second region, the third neural network model associated with a third region within the environment.

12. The robot of claim 11, wherein the processor circuitry is to remove the first neural network model from memory after the robot enters the second region.

13. The robot of claim 1, wherein the robot is to navigate through the environment without a map of the environment.

14. The robot of claim 1, wherein the environment is an indoor environment.

15. The robot of claim 14, wherein the image sensor is directed upward such that the first and second images include a ceiling of the indoor environment.

16. A non-transitory computer readable medium comprising instructions that, when executed, cause a robot to at least:
capture, with an image sensor, a first image of an environment from within a first region of the environment;
autonomously move within the first region toward a second region within the environment based on the first image and a first neural network model used exclusively when the robot is in associated with the first region;
capture, with the image sensor, a second image corresponding to the second region; and
autonomously move within the second region based on the second image and a second neural network model used exclusively when the robot is in the second region.

17. The non-transitory computer readable medium of claim 16, wherein the first region overlaps the second region, the first and second regions defining different portions of a travel path for the robot to navigate through the environment.

18. The non-transitory computer readable medium of claim 17, wherein the instructions further cause the robot to:
respond to an obstacle along the travel path by requesting a new travel path from a remote server, the new travel path defined by different regions within the environment; and
autonomously move along the new travel path based on different neural network models associated with respective ones of the different regions.

19. The non-transitory computer readable medium of claim 18, wherein the instructions further cause the robot to download the different neural network models before detection of the obstacle.

20. The non-transitory computer readable medium of claim 16, wherein a center point of the first region is located within the second region.

21. The non-transitory computer readable medium of claim 20, wherein the instructions further cause the robot to autonomously move toward the second region by autonomously moving toward the center point of the first region.

22. The non-transitory computer readable medium of claim 16, wherein the instructions further cause the robot to:
determine a distance between a current location of the robot and a center point of the first region;
determine an orientation of the robot relative to the center point; and
autonomously move based on the distance and the orientation.

23. A method to autonomously control movement of a robot, the method comprising:
capturing, with an image sensor, a first image of an environment from within a first region of the environment;
autonomously controlling movement of the robot within the first region toward a second region within the environment based on the first image and a first neural network model, the first neural network model used exclusively when the robot is in the first region;
capturing, with the image sensor, a second image corresponding to the second region; and
autonomously controlling movement of the robot within the second region based on the second image and a second neural network model, the second neural network model used exclusively when the robot is in the second region.

24. The method of claim 23, wherein the first region overlaps the second region, the first and second regions defining different portions of a travel path for the robot to navigate through the environment.

25. The method of claim 23, wherein a center point of the first region is located within the second region.

26. The method of claim 25, further including autonomously controlling movement of the robot toward the second region by controlling movement of the robot toward the center point of the first region.

27. The method of claim 23, further including:
determining a distance between a current location of the robot and a center point of the first region;
determining an orientation of the robot relative to the center point; and
autonomously controlling movement of the robot based on the distance and the orientation.

* * * * *